US012358535B2

(12) United States Patent
Crouch et al.

(10) Patent No.: US 12,358,535 B2
(45) Date of Patent: Jul. 15, 2025

(54) SYSTEMS AND METHODS FOR AUTONOMOUS VEHICLE CONTROL USING DEPOLARIZATION RATIO OF RETURN SIGNAL

(71) Applicant: AURORA OPERATIONS, INC., Mountain View, CA (US)

(72) Inventors: Stephen Crouch, Bozeman, MT (US); Zeb Barber, Bozeman, MT (US); Emil Kadlec, Bozeman, MT (US); Ryan Galloway, Bozeman, MT (US); Sean Spillane, Bozeman, MT (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 0 days.

(21) Appl. No.: 18/512,260

(22) Filed: Nov. 17, 2023

(65) Prior Publication Data

US 2024/0308548 A1 Sep. 19, 2024

Related U.S. Application Data

(63) Continuation of application No. 17/494,188, filed on Oct. 5, 2021, now Pat. No. 11,858,533, which is a
(Continued)

(51) Int. Cl.
*B60W 60/00* (2020.01)
*G01S 7/481* (2006.01)
(Continued)

(52) U.S. Cl.
CPC ....... *B60W 60/0025* (2020.02); *G01S 7/4811* (2013.01); *G01S 7/4817* (2013.01);
(Continued)

(58) Field of Classification Search
CPC ..... B60W 60/0025; B60W 2554/4029; B60W 2420/52; B60W 2552/53; B60W 2552/05;
(Continued)

(56) References Cited

U.S. PATENT DOCUMENTS

| 8,831,780 B2 | 9/2014 | Zelivinski et al. |
| 9,807,564 B2 | 10/2017 | Aksamit |
(Continued)

FOREIGN PATENT DOCUMENTS

| CN | 106853825 A | 6/2017 |
| CN | 110268683 A | 9/2019 |
(Continued)

OTHER PUBLICATIONS

Chinese Office Action issued in connection with CN Appl. Ser. No. 202180037647.X dated May 30, 2023.
(Continued)

*Primary Examiner* — Shon G Foley
(74) *Attorney, Agent, or Firm* — Dority & Manning, P.A.

(57) ABSTRACT

A light detection and ranging (LIDAR) system for a vehicle, includes a laser source configured to output a beam, a transmitter, a receiver, one or more optics and a processor. The transmitter is configured to transmit a transmit signal that is generated based on the beam. The receiver is configured to receive a return signal reflected by an object in response to the transmit signal. The one or more optics are configured to generate a first signal and a second signal based on the return signal, wherein the first signal and the second signal have different polarizations. The processor is configured to determine a type of the object by processing a signal-to-noise ratio (SNR) value of the first signal and a SNR value of the second signal.

20 Claims, 19 Drawing Sheets
(10 of 19 Drawing Sheet(s) Filed in Color)

Related U.S. Application Data continuation of application No. 17/167,864, filed on Feb. 4, 2021, now Pat. No. 11,161,526, which is a continuation of application No. 16/916,981, filed on Jun. 30, 2020, now Pat. No. 10,960,900.

(51) Int. Cl.
  *G01S 7/4912* (2020.01)
  *G01S 17/34* (2020.01)
  *G01S 17/58* (2006.01)
  *G01S 17/931* (2020.01)

(52) U.S. Cl.
  CPC ............ *G01S 7/4912* (2013.01); *G01S 17/34* (2020.01); *G01S 17/58* (2013.01); *G01S 17/931* (2020.01); *B60W 2420/408* (2024.01); *B60W 2552/05* (2020.02); *B60W 2552/53* (2020.02); *B60W 2554/4029* (2020.02)

(58) Field of Classification Search
  CPC ...... G01S 17/58; G01S 7/4912; G01S 7/4817; G01S 7/4811; G01S 17/34; G01S 17/931
  See application file for complete search history.

(56) References Cited

U.S. PATENT DOCUMENTS

| | | |
|---|---|---|
| 2003/0023614 A1 | 1/2003 | Newstrom |
| 2009/0142066 A1 | 6/2009 | Leclair et al. |
| 2013/0141577 A1 | 6/2013 | Yoo |
| 2014/0055661 A1 | 2/2014 | Imamura et al. |
| 2017/0299697 A1 | 10/2017 | Swanson |
| 2018/0081031 A1 | 3/2018 | Yuan |
| 2018/0203113 A1 | 7/2018 | Taylor |
| 2019/0154835 A1 | 5/2019 | Maleki et al. |
| 2019/0324134 A1 | 10/2019 | Cattle |
| 2019/0369212 A1 | 12/2019 | Dylewski |
| 2020/0182988 A1 | 6/2020 | Pau |
| 2021/0181309 A1 | 6/2021 | Oza et al. |

FOREIGN PATENT DOCUMENTS

| | | |
|---|---|---|
| JP | 2011-185837 A | 9/2011 |
| JP | 2013-160717 A | 8/2013 |
| JP | 2018151277 A | 9/2018 |
| KR | 20160050436 A | 5/2016 |
| WO | WO-2018/067158 A1 | 4/2018 |
| WO | WO-2018/107237 A1 | 6/2018 |
| WO | WO-2020/021311 A1 | 1/2020 |
| WO | WO-2020/039039 A1 | 2/2020 |

OTHER PUBLICATIONS

Dimitrievski, M. et al., "Behavioral Pedestrian Tracking Using A Camera and LiDAR Sensors On A Moving Vehicle", Sensors, 19(2), 391, Jan. 2019, 24 pages.

Final Office Action on U.S. Appl. No. 17/494,188 DTD Apr. 24, 2023.

Foreign Action other than Search Report on PCT DTD Jan. 12, 2023.

International Search Report and Written Opinion on PCT Appl. Ser. No. PCT/US2021/035331 dated Jul. 8, 2021 (6 pages).

Japanese Office Action issued in connection with JP Appl. Ser. No. 2022-573306 dated Jun. 6, 2023.

Non-Final Office Action on U.S. Appl. No. 17/494,188 DTD Dec. 9, 2022.

Non-Final Office Action on U.S. Appl. No. 16/916,981 dated Sep. 11, 2020 (12 pages).

Notice of Allowance on U.S. Appl. No. 17/494,188 DTD Aug. 23, 2023.

Notice of Allowance on U.S. Appl. No. 16/916,981 dated Oct. 30, 2020 (5 pages).

Notice of Allowance on U.S. Appl. No. 17/167,864 dated Jun. 30, 2021 (11 pages).

Nunes-Pereira, E.J. et al., "Polarization-coded material classification in automotive LIDAR aiming at safer autonomous driving implementations", Applied Optics, vol. 59, Issue 8, pp. 2530-2540, Jan. 2020.

Sandford, C. et al., "The potential use of the linear depolarization ratio to distinguish between convective and stratiform rainfall to improve radar rain-rate estimates", Journal of Applied Meteorology and Climatology, vol. 56, Issue 11, pp. 2927-2940, Aug. 2017.

US Office Action on U.S. Appl. No. 17/167,864 dated Mar. 25, 2021 (17 pages).

Extended European Search Report issued in connection with EP Appl. No. 21833817.6 dated Aug. 14, 2023.

Ullrich A et al: "Noisy lidar point clouds: impact on information extraction in high-precision lidar surveying", Proceedings of SPIE; [Proceedings of SPIE ISSN 0277-786X vol. 10524], SPIE, US, vol. 10636, May 10, 2018 (May 10, 2018), pp. 106360M-106360M, XP060106571, DOI: 10.1117/12.2304351 ISBN: 978-1-5106-1533-5.

Office Action issued in connection with Japanese Appl. No. 2023-187347 dated Jan. 30, 2024.

SYSTEMS AND METHODS FOR AUTONOMOUS VEHICLE CONTROL USING DEPOLARIZATION RATIO OF RETURN SIGNAL

CROSS-REFERENCE TO RELATED APPLICATION

The present application is a Continuation of U.S. patent application Ser. No. 17/494,188, filed Oct. 5, 2021, which is a Continuation of U.S. patent application Ser. No. 17/167,864, filed Feb. 4, 2021 (now U.S. Pat. No. 11,161,526), which is a Continuation of U.S. patent application Ser. No. 16/916,981, filed Jun. 30, 2020 (now U.S. Pat. No. 10,960,900). The entire disclosures of U.S. patent application Ser. No. 16/916,981, U.S. patent application Ser. No. 17/167,864 and U.S. patent application Ser. No. 17/494,188 are incorporated herein by reference in their entireties.

BACKGROUND

One of the challenges to any autonomous vehicle-related technology relates to collecting and interpreting information about a vehicle's surrounding environment, along with planning and executing commands to appropriately control vehicle motion to navigate the vehicle through its current environment. For example, measurement data can be captured from one or more sensors of an autonomous vehicle (or a vehicle equipped with autonomous vehicle sensors) and used for tracking and/or determining dynamic objects within the environment surrounding the vehicle. It can be difficult to detect and track the shapes of objects with sufficient precision and accuracy to enable effective autonomous decision-making in response to the objects.

SUMMARY

Implementations of the present disclosure relate to a system and a method for controlling a vehicle using light detection and ranging (lidar), and more particularly to a system and a method for controlling a vehicle by detecting an object using a depolarization ratio of a return signal reflected by the object.

In some implementations of the present disclosure, a light detection and ranging (lidar) system may include a transmitter configured to transmit a transmit signal from a laser source, a receiver configured to receive a return signal reflected by an object, one or more optics, and a processor. The one or more optics may be configured to generate a first polarized signal of the return signal with a first polarization, and generate a second polarized signal of the return signal with a second polarization that is orthogonal to the first polarization. The processor may be configured to calculate a ratio of reflectivity between the first polarized signal and the second polarized signal.

In some implementations of the present disclosure, an autonomous vehicle control system may include one or more processors. The one or more processors may be configured to cause a transmitter to transmit a transmit signal from a laser source. The one or more processors may be configured to cause a receiver to receive a return signal reflected by an object. The one or more processors may be configured to cause one or more optics to generate a first polarized signal of the return signal with a first polarization, and generate a second polarized signal of the return signal with a second polarization that is orthogonal to the first polarization. The one or more processors may be configured to operate a vehicle based on a ratio of reflectivity between the first polarized signal and the second polarized signal.

In some implementations of the present disclosure, a method may include transmitting, from a laser source, a transmit signal and receiving a return signal reflected by an object. The method may include generating, by one or more optics, a first polarized signal of the return signal with a first polarization. The method may include generating, by the one or more optics, a second polarized signal of the return signal with a second polarization that is orthogonal to the first polarization. The method may include operating, by one or more processors, a vehicle based on a ratio of reflectivity between the first polarized signal and the second polarized signal.

BRIEF DESCRIPTION OF THE DRAWINGS

The patent or application file contains at least one drawing executed in color. Copies of this patent application publication with color drawing(s) will be provided by the Office upon request and payment of the necessary fee.

These and other aspects and features of the present implementations will become apparent to those ordinarily skilled in the art upon review of the following description of specific implementations in conjunction with the accompanying figures, wherein.

DETAILED DESCRIPTION

Figure 1A:
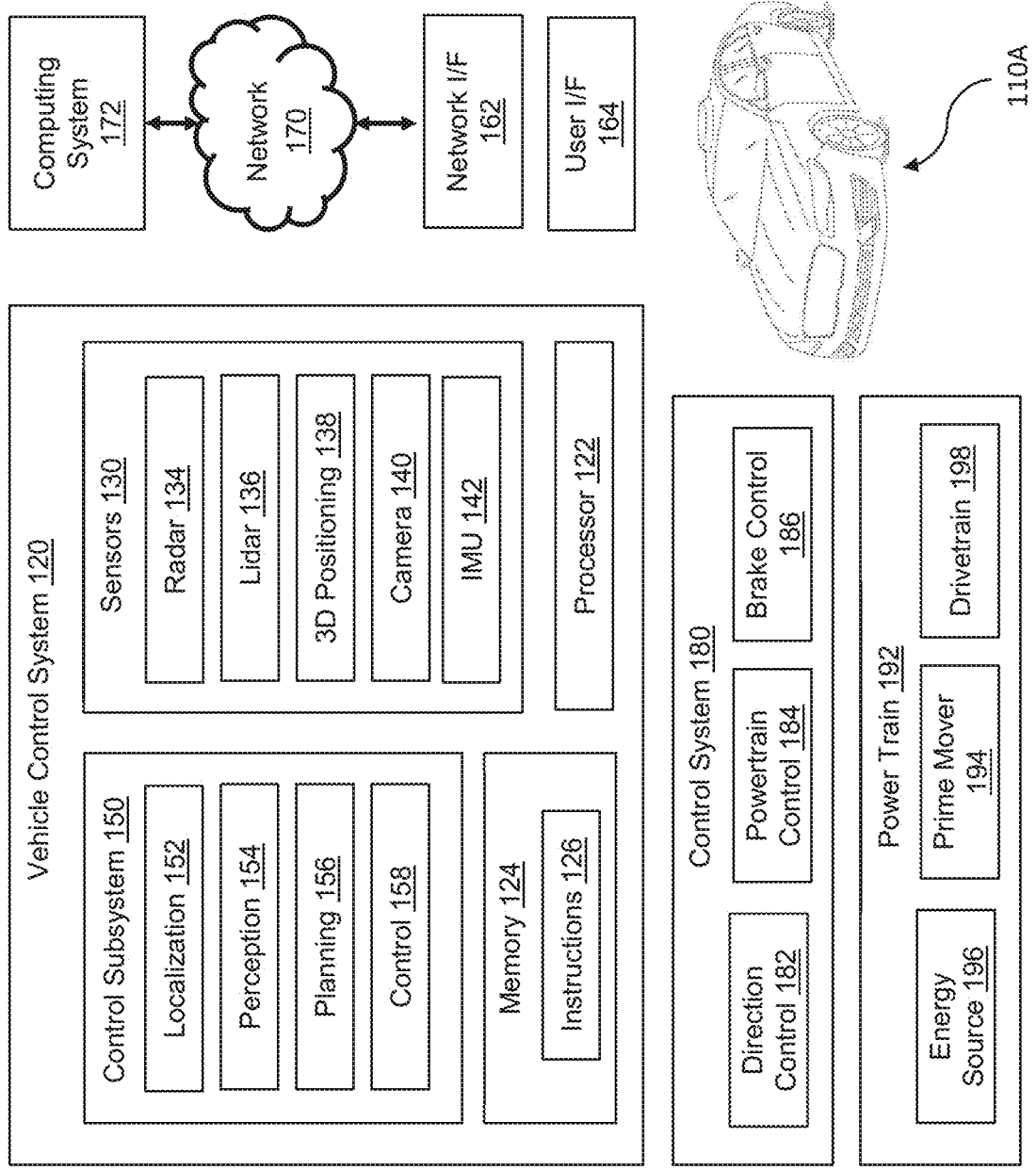
FIG. 1A is a block diagram illustrating an example of a system environment for autonomous vehicles according to some implementations.

According to certain aspects, implementations in the present disclosure relate to a system and a method for controlling a vehicle using light detection and ranging (lidar), and more particularly to a system and a method for controlling a vehicle by detecting an object using a depolarization ratio of a return signal reflected by the object.

According to certain aspects, an autonomous vehicle control system may include one or more processors. The one or more processors may be configured to cause a transmitter to transmit a transmit signal from a laser source. The one or more processors may be configured to cause a receiver to receive a return signal reflected by an object. The one or more processors may be configured to cause one or more optics to generate a first polarized signal of the return signal with a first polarization, and generate a second polarized signal of the return signal with a second polarization that is orthogonal to the first polarization. The one or more processors may be configured to operate a vehicle based on a ratio of reflectivity between the first polarized signal and the second polarized signal.

In a conventional lidar system, laser signal (LS) is linearly polarized. In reflecting a signal transmitted from the lidar system, many objects in the world depolarize the return signal. For example, a return signal of each object may come back with the same polarization state as the polarized LS or with different polarization state from the polarized LS. However, the lidar system may detect only the polarized part of the return signal consistent with the polarized LS. As a result, the other polarization of the return signal is not measured or utilized.

To solve this problem, in some implementations, a polarization-sensitive lidar can be provided by splitting out the return light into two polarization states, so that they can be detected independently. The signals split into the two polarization states can then be compared to estimate how much the object (or target) has depolarized the return signal. A lidar system may include a polarization beam splitter (PBS). The PBS may be a polarization beam splitters/combiners (PBSC). The split return signals may indicate respective separate images of the object in different polarization states. The lidar system may calculate a ratio between the separate images of the object in different polarization states (referred to as "a depolarization ratio").

In some implementations, the lidar system may include two detectors configured to detect respective polarized signals from the return signal using a splitter. The splitter may be a polarization beam splitter (PBS). The lidar system may include a single detector configured to detect two polarized signals from the return signal using a splitter and a phase shifter by multiplexing the return signal into the single detector.

In some implementations, in response to detecting two polarized signals, one or more detectors may generate corresponding two electrical signals in separate channels so that the electrical signals can be processed independently by a processing system. The two electrical signals may indicate respective separate images of the object in different polarization states. The lidar system may calculate a depolarization ratio between the separate images of the object in different polarization states.

In some implementations, a system may have two beams of polarization sensitive lidar, each of which has two receive/digitizer channels for independent signal processing. The system may process, in two independent channels, independent streams from a point of cloud.

In some implementations, a processing system may perform a simple post processing on the electrical signals in each channel to produce imagery for the object in the respective polarization. The processing system may calculate an average reflectivity of an image of the object over a plurality of samples. The processing system may perform a spatial averaging per voxel. For example, the processing system may include a hash-based voxelizer to efficiently generate a plurality of voxels representing the object in a polarization state. With a hash-based voxelizer, the processing system can perform a quick search for a voxel. The processing system may calculate an average reflectivity within each voxel of the plurality of voxels over a plurality of samples. As a result, the calculated average reflectivity may be different from measured values of reflectivity. For example, each measurement value is not correlated while an average may be correlated. The number of samples for averaging is less than 100. For example, 5 or 12 samples may be used. The processing system may calculate a ratio of the average reflectivity within each voxel between two channels.

In some implementations, an average reflectivity over some region of a space (e.g., over some voxels) may be meaningful to understand polarization of the object. In some implementations, the use of average reflectivity can effectively reduce variance in the reflectivity measurement caused by laser speckle, when a coherent lidar system is used, for example. The average reflectivity of voxel over a plurality of samples may be affected by selection of parameters, for example, spatial resolution or precision (e.g., a voxel of 5 cm×10 cm dimension). In general, averaging of smaller voxel may have fewer contribution to averaging of the whole image of the object, while it may have more contribution to contrast of the image (make the object more distinguishable). Selection of proper parameters can provide another dimension from pure reflectivity measurement, thereby increasing value of data.

According to certain aspects, implementations in the present disclosure relate to a light detection and ranging (lidar) system that includes a transmitter configured to transmit a transmit signal from a laser source, a receiver configured to receive a return signal reflected by an object, one or more optics, and a processor. The one or more optics may be configured to generate a first polarized signal of the return signal with a first polarization, and generate a second polarized signal of the return signal with a second polarization that is orthogonal to the first polarization. The processor may be configured to calculate a ratio of reflectivity between the first polarized signal and the second polarized signal.

According to certain aspects, implementations in the present disclosure relate to a method that includes transmitting, from a laser source, a transmit signal and receiving a return signal reflected by an object. The method may include generating, by one or more optics, a first polarized signal of the return signal with a first polarization. The method may include generating, by the one or more optics, a second polarized signal of the return signal with a second polarization that is orthogonal to the first polarization. The method may include operating, by one or more processors, a vehicle based on a ratio of reflectivity between the first polarized signal and the second polarized signal.

Various implementations in the present disclosure have one or more of the following advantages and benefits.

First, implementations in the present disclosure can provide useful techniques for improving disambiguation of different objects using another unique signal mapped onto the point cloud based on a depolarization ratio in addition to signals conventionally used, e.g., reflectivity signals only. In some implementations, object detection based on a depolarization ratio can disambiguate several key surfaces, for example, (1) asphalt (vs. grass, rough concrete, or gravel), (2) metal poles (vs. trees or telephone/utility poles), (3) retro-signs (vs. metal surfaces), (4) lane markings (vs. road surfaces), and (5) vehicle plate (vs. vehicle surfaces). This disambiguation techniques can help recognize certain road markings, signs, pedestrians, etc. The depolarization ratio can detect or recognize sparse features (e.g., features having a relatively smaller region), so that such sparse features can be easily registered for disambiguation of different objects. Disambiguation of different objects or materials based on the depolarization ratio can help a perception system to more accurately detect, track, determine, and/or classify objects within the environment surrounding the vehicle (e.g., using artificial intelligence techniques).

Second, implementations in the present disclosure can provide useful techniques for improving stability and accuracy of object detection by utilizing a differential measurement (e.g., ratio of reflectivity between signals with different polarization states) which should lead to low variance across changing conditions (e.g., weather changes-snow, ice, rain, etc.).

Third, implementations in the present disclosure can provide useful techniques for making lidar systems more interchangeable relative to a specific data product. Metal or specular surfaces often generate stronger "glint" returns in radar data. This "glint" effect may exhibit less variance at different common lidar wavelength (i.e., 905 nm vs. 1550 nm). In other words, reflectivity-based features often change significantly at different wavelengths. Because the polarization ratio measurement is not so sensitive to exact wavelength, it can make lidar systems more interchangeable relative to a specific data product.

Fourth, the depolarization ratio can be related to the magnitude of the angle of incidence between the lidar beam and the object. This can be helpful for determining surface normals which are commonly used in localization and mapping. In some implementations, one more datatype or piece of information on the magnitude of the angle of incident can be obtained from the depolarization ratio measurement to be able to gain benefit in localization and mapping, for example.

Fifth, implementations in the present disclosure can provide useful techniques for improving other technical fields such as localization (e.g., spatial relationships between the vehicle and stationary objects), camera simulation, lidar/radar simulation, radar measurements. For example, detection of contrast in common building materials can be utilized in localization. In some implementations, the depolarization ratio can reveal or indicate whether a surface has properties of diffuse reflection or specular reflection. Surface property information on diffuse or specular reflection may be obtained based on the depolarization ratio and represented in a high definition (HD) map, so that such surface property information can be extracted by an autonomous vehicle control system. Such surface property information can be used for a camera simulation in modeling different lighting conditions. Similarly, the depolarization ratio can be utilized in an integrated lidar/radar simulation. Such surface property information can be also utilized in analyzing radar data or camera data.

1. System Environment for Autonomous Vehicles

FIG. 1A is a block diagram illustrating an example of a system environment for autonomous vehicles according to some implementations.

Referring to FIG. 1A, an example autonomous vehicle 110A within which the various techniques disclosed herein may be implemented. The vehicle 110A, for example, may include a powertrain 192 including a prime mover 194 powered by an energy source 196 and capable of providing power to a drivetrain 198, as well as a control system 180 including a direction control 182, a powertrain control 184, and a brake control 186. The vehicle 110A may be implemented as any number of different types of vehicles, including vehicles capable of transporting people and/or cargo, and capable of traveling in various environments, and it will be appreciated that the aforementioned components 180-198 can vary widely based upon the type of vehicle within which these components are utilized.

For simplicity, the implementations discussed hereinafter will focus on a wheeled land vehicle such as a car, van, truck, bus, etc. In such implementations, the prime mover 194 may include one or more electric motors and/or an internal combustion engine (among others). The energy source may include, for example, a fuel system (e.g., providing gasoline, diesel, hydrogen, etc.), a battery system, solar panels or other renewable energy source, and/or a fuel cell system. The drivetrain 198 can include wheels and/or tires along with a transmission and/or any other mechanical drive components to convert the output of the prime mover 194 into vehicular motion, as well as one or more brakes configured to controllably stop or slow the vehicle 110A and direction or steering components suitable for controlling the trajectory of the vehicle 110A (e.g., a rack and pinion steering linkage enabling one or more wheels of the vehicle 110A to pivot about a generally vertical axis to vary an angle of the rotational planes of the wheels relative to the longitudinal axis of the vehicle). In some implementations, combinations of powertrains and energy sources may be used (e.g., in the case of electric/gas hybrid vehicles), and in some instances multiple electric motors (e.g., dedicated to individual wheels or axles) may be used as a prime mover.

The direction control 182 may include one or more actuators and/or sensors for controlling and receiving feedback from the direction or steering components to enable the vehicle 110A to follow a desired trajectory. The powertrain control 184 may be configured to control the output of the powertrain 102, e.g., to control the output power of the prime mover 194, to control a gear of a transmission in the drivetrain 198, etc., thereby controlling a speed and/or direction of the vehicle 110A. The brake control 116 may be configured to control one or more brakes that slow or stop vehicle 110A, e.g., disk or drum brakes coupled to the wheels of the vehicle.

Other vehicle types, including but not limited to off-road vehicles, all-terrain or tracked vehicles, construction equipment etc., will necessarily utilize different powertrains, drivetrains, energy sources, direction controls, powertrain controls and brake controls. Moreover, in some implementations, some of the components can be combined, e.g., where directional control of a vehicle is primarily handled by varying an output of one or more prime movers. Therefore, implementations disclosed herein are not limited to the particular application of the herein-described techniques in an autonomous wheeled land vehicle.

Various levels of autonomous control over the vehicle 110A can be implemented in a vehicle control system 120, which may include one or more processors 122 and one or more memories 124, with each processor 122 configured to execute program code instructions 126 stored in a memory 124. The processors(s) can include, for example, graphics processing unit(s) ("GPU(s)") and/or central processing unit(s) ("CPU(s)").

Sensors 130 may include various sensors suitable for collecting information from a vehicle's surrounding environment for use in controlling the operation of the vehicle. For example, sensors 130 can include radar sensor 134, lidar (Light Detection and Ranging) sensor 136, a 3D positioning sensors 138, e.g., any of an accelerometer, a gyroscope, a magnetometer, or a satellite navigation system such as GPS (Global Positioning System), GLONASS (Globalnaya Navigazionnaya Sputnikovaya Sistema, or Global Navigation Satellite System), BeiDou Navigation Satellite System (BDS), Galileo, Compass, etc. The 3D positioning sensors 138 can be used to determine the location of the vehicle on the Earth using satellite signals. The sensors 130 can include a camera 140 and/or an IMU (inertial measurement unit) 142. The camera 140 can be a monographic or stereographic camera and can record still and/or video images. The IMU 142 can include multiple gyroscopes and accelerometers capable of detecting linear and rotational motion of the vehicle in three directions. One or more encoders (not illustrated), such as wheel encoders may be used to monitor the rotation of one or more wheels of vehicle 110A. Each sensor 130 can output sensor data at various data rates, which may be different than the data rates of other sensors 130.

The outputs of sensors 130 may be provided to a set of control subsystems 150, including, a localization subsystem 152, a planning subsystem 156, a perception subsystem 154, and a control subsystem 158. The localization subsystem 152 can perform functions such as precisely determining the location and orientation (also sometimes referred to as "pose") of the vehicle 110A within its surrounding environment, and generally within some frame of reference. The location of an autonomous vehicle can be compared with the location of an additional vehicle in the same environment as part of generating labeled autonomous vehicle data. The perception subsystem 154 can perform functions such as detecting, tracking, determining, and/or identifying objects within the environment surrounding vehicle 110A. A machine learning model can be utilized in tracking objects. The planning subsystem 156 can perform functions such as planning a trajectory for vehicle 110A over some timeframe given a desired destination as well as the static and moving objects within the environment. A machine learning can be utilized in planning a vehicle trajectory. The control subsystem 158 can perform functions such as generating suitable control signals for controlling the various controls in the vehicle control system 120 in order to implement the planned trajectory of the vehicle 110A. A machine learning model can be utilized to generate one or more signals to control an autonomous vehicle to implement the planned trajectory.

It will be appreciated that the collection of components illustrated in FIG. 1A for the vehicle control system 120 is merely exemplary in nature. Individual sensors may be omitted in some implementations. Additionally or alternatively, in some implementations, multiple sensors of types illustrated in FIG. 1A may be used for redundancy and/or to cover different regions around a vehicle, and other types of sensors may be used. Likewise, different types and/or combinations of control subsystems may be used in other implementations. Further, while subsystems 152-158 are illustrated as being separate from processor 122 and memory 124, it will be appreciated that in some implementations, some or all of the functionality of a subsystem 152-158 may be implemented with program code instructions 126 resident in one or more memories 124 and executed by one or more processors 122, and that these subsystems 152-158 may in some instances be implemented using the same processor(s) and/or memory. Subsystems may be implemented at least in part using various dedicated circuit logic, various processors, various field programmable gate arrays ("FPGA"), various application-specific integrated circuits ("ASIC"), various real time controllers, and the like, as noted above, multiple subsystems may utilize circuitry, processors, sensors, and/or other components. Further, the various components in the vehicle control system 120 may be networked in various manners.

In some implementations, the vehicle 110A may also include a secondary vehicle control system (not illustrated), which may be used as a redundant or backup control system for the vehicle 110A. The secondary vehicle control system may be capable of fully operating the autonomous vehicle 110A in the event of an adverse event in the vehicle control system 120, while in other implementations, the secondary vehicle control system may only have limited functionality, e.g., to perform a controlled stop of the vehicle 110A in response to an adverse event detected in the primary vehicle control system 120. In still other implementations, the secondary vehicle control system may be omitted.

In general, an innumerable number of different architectures, including various combinations of software, hardware, circuit logic, sensors, networks, etc. may be used to implement the various components illustrated in FIG. 1A. Each processor may be implemented, for example, as a microprocessor and each memory may represent the random access memory ("RAM") devices comprising a main storage, as well as any supplemental levels of memory, e.g., cache memories, non-volatile or backup memories (e.g., programmable or flash memories), read-only memories, etc. In addition, each memory may be considered to include memory storage physically located elsewhere in the vehicle 110A, e.g., any cache memory in a processor, as well as any storage capacity used as a virtual memory, e.g., as stored on a mass storage device or another computer controller. One or more processors illustrated in FIG. 1A, or entirely separate processors, may be used to implement additional functionality in the vehicle 110A outside of the purposes of autonomous control, e.g., to control entertainment systems, to operate doors, lights, convenience features, etc.

In addition, for additional storage, the vehicle 110A may include one or more mass storage devices, e.g., a removable disk drive, a hard disk drive, a direct access storage device ("DASD"), an optical drive (e.g., a CD drive, a DVD drive, etc.), a solid state storage drive ("SSD"), network attached storage, a storage area network, and/or a tape drive, among others.

Furthermore, the vehicle 110A may include a user interface 164 to enable vehicle 110A to receive a number of inputs from and generate outputs for a user or operator, e.g., one or more displays, touchscreens, voice and/or gesture interfaces, buttons and other tactile controls, etc. Otherwise, user input may be received via another computer or electronic device, e.g., via an app on a mobile device or via a web interface.

Moreover, the vehicle 110A may include one or more network interfaces, e.g., network interface 162, suitable for communicating with one or more networks 170 (e.g., a Local Area Network ("LAN"), a wide area network ("WAN"), a wireless network, and/or the Internet, among others) to permit the communication of information with other computers and electronic device, including, for example, a central service, such as a cloud service, from which the vehicle 110A receives environmental and other data for use in autonomous control thereof. Data collected by the one or more sensors 130 can be uploaded to a computing system 172 via the network 170 for additional processing. A time stamp can be added to each instance of vehicle data prior to uploading. Additional processing of autonomous vehicle data by computing system 172 in accordance with many implementations is described with respect to FIG. 2.

Each processor illustrated in FIG. 1A, as well as various additional controllers and subsystems disclosed herein, generally operates under the control of an operating system and executes or otherwise relies upon various computer software applications, components, programs, objects, modules, data structures, etc., as will be described in greater detail below. Moreover, various applications, components, programs, objects, modules, etc. may also execute on one or more processors in another computer coupled to vehicle 110A via network 170, e.g., in a distributed, cloud-based, or client-server computing environment, whereby the processing required to implement the functions of a computer program may be allocated to multiple computers and/or services over a network.

In general, the routines executed to implement the various implementations described herein, whether implemented as part of an operating system or a specific application, component, program, object, module or sequence of instructions, or even a subset thereof, will be referred to herein as "program code". Program code can include one or more instructions that are resident at various times in various memory and storage devices, and that, when read and executed by one or more processors, perform the steps necessary to execute steps or elements embodying the various aspects of the present disclosure. Moreover, while implementations have and hereinafter will be described in the context of fully functioning computers and systems, it will be appreciated that the various implementations described herein are capable of being distributed as a program product in a variety of forms, and that implementations can be implemented regardless of the particular type of computer readable media used to actually carry out the distribution.

Examples of computer readable media include tangible, non-transitory media such as volatile and non-volatile memory devices, floppy and other removable disks, solid state drives, hard disk drives, magnetic tape, and optical disks (e.g., CD-ROMs, DVDs, etc.) among others.

In addition, various program code described hereinafter may be identified based upon the application within which it is implemented in a specific implementation. However, it should be appreciated that any particular program nomenclature that follows is used merely for convenience, and thus the present disclosure should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the present disclosure is not limited to the specific organization and allocation of program functionality described herein.

The environment illustrated in FIG. 1A is not intended to limit implementations disclosed herein. Indeed, other alternative hardware and/or software environments may be used without departing from the scope of implementations disclosed herein.

2. FM LIDAR for Automotive Applications

Figure 3A:
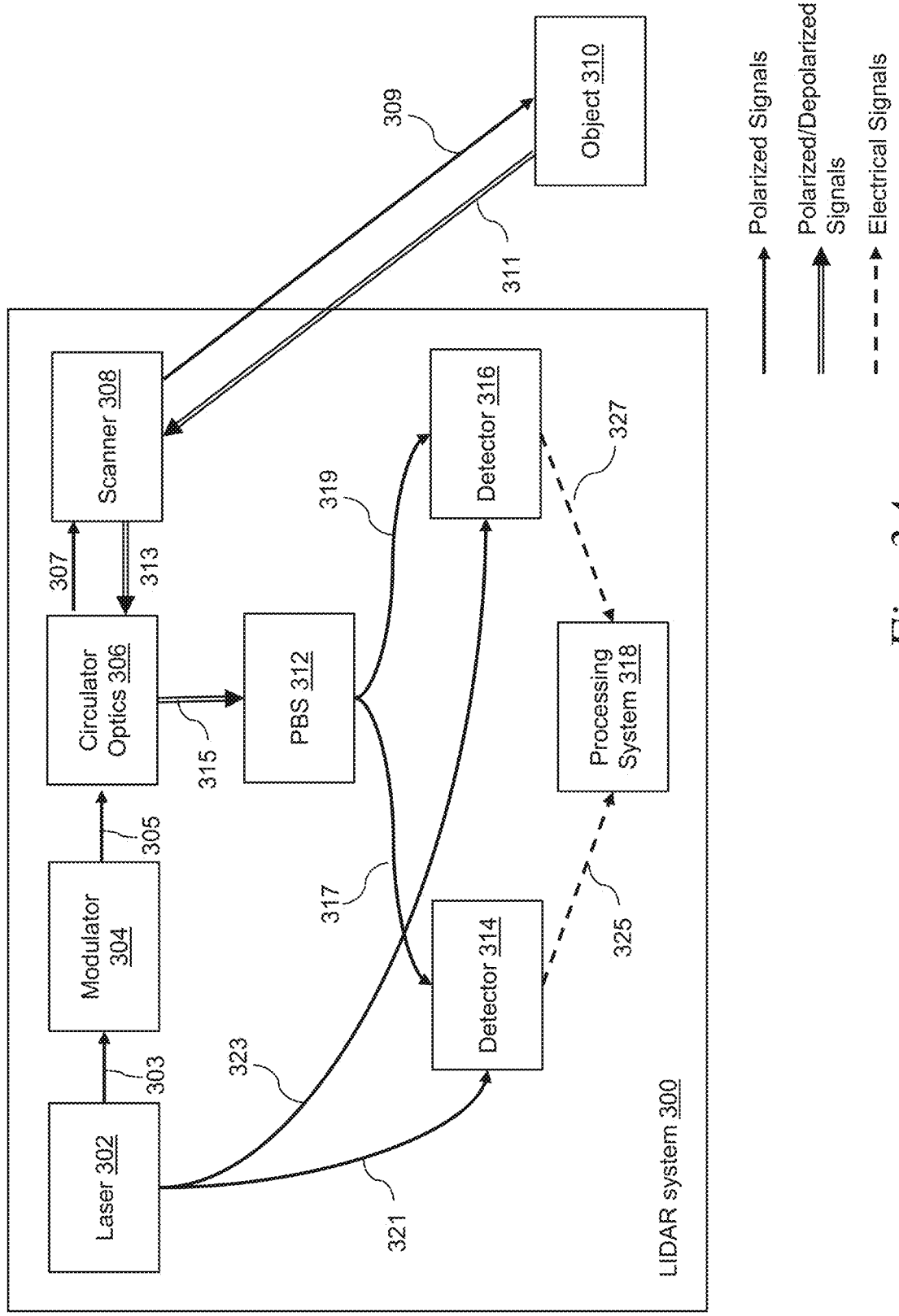
FIG. 3A is a block diagram illustrating an example of a lidar system according to some implementations.
Figure 3B:
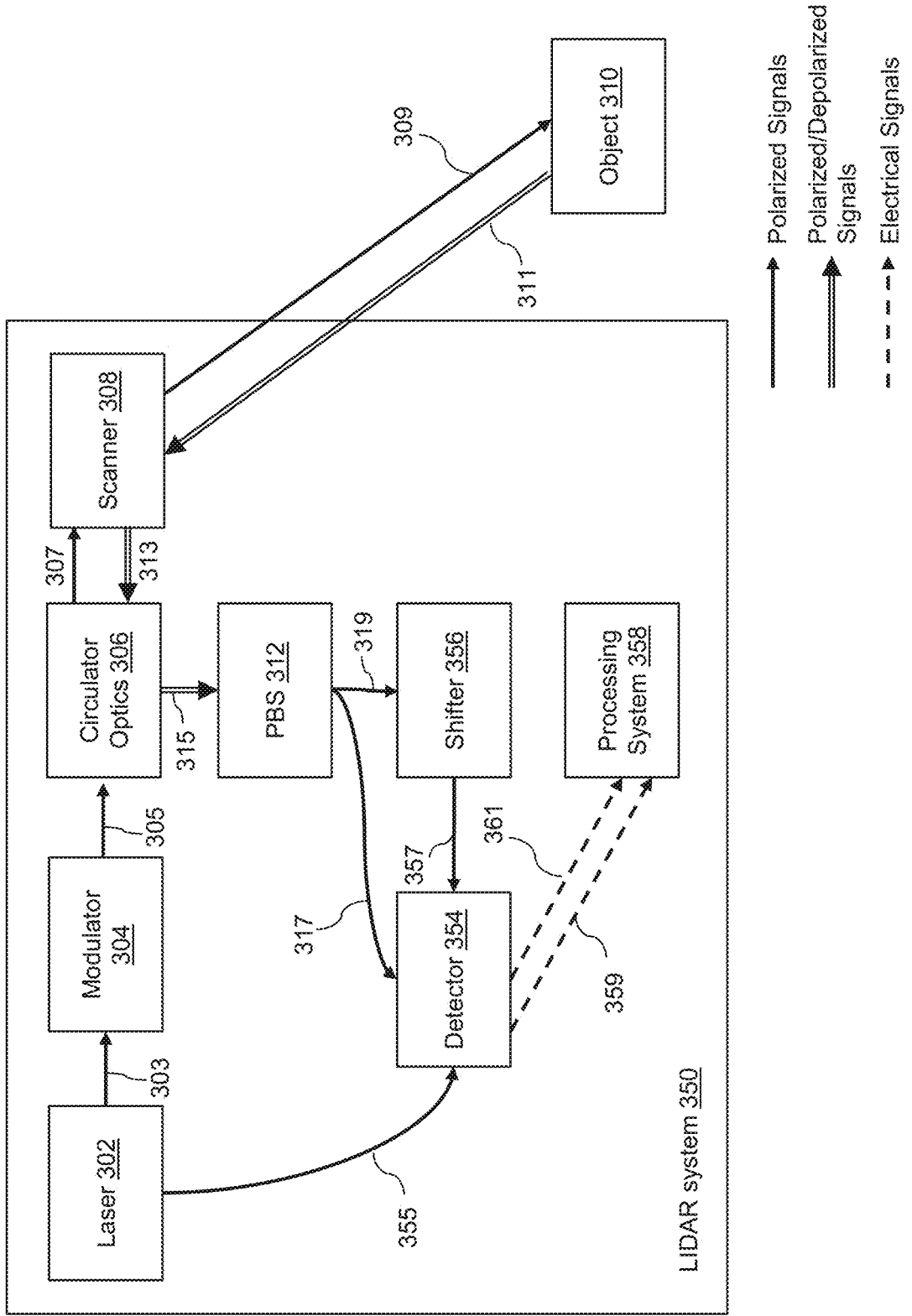
FIG. 3B is a block diagram illustrating another example of a lidar system according to some implementations.

A truck can include a lidar system (e.g., vehicle control system 120 in FIG. 1A, lidar system 300 in FIG. 3A, lidar system 350 in FIG. 3B, etc.). In some implementations, the lidar system can use frequency modulation to encode an optical signal and scatter the encoded optical signal into free-space using optics. By detecting the frequency differences between the encoded optical signal and a returned signal reflected back from an object, the frequency modulated (FM) lidar system can determine the location of the object and/or precisely measure the velocity of the object using the Doppler effect. An FM lidar system may use a continuous wave (referred to as, "FMCW lidar" or "coherent FMCW lidar") or a quasi-continuous wave (referred to as, "FMQW lidar"). The lidar system can use phase modulation (PM) to encode an optical signal and scatters the encoded optical signal into free-space using optics.

An FM or phase-modulated (PM) lidar system may provide substantial advantages over conventional lidar systems with respect to automotive and/or commercial trucking applications. To begin, in some instances, an object (e.g., a pedestrian wearing dark clothing) may have a low reflectivity, in that it only reflects back to the sensors (e.g., sensors 130 in FIG. 1A) of the FM or PM lidar system a low amount (e.g., 10% or less) of the light that hit the object. In other instances, an object (e.g., a shiny road sign) may have a high reflectivity (e.g., above 10%), in that it reflects back to the sensors of the FM lidar system a high amount of the light that hit the object.

Regardless of the object's reflectivity, an FM lidar system may be able to detect (e.g., classify, recognize, discover, etc.) the object at greater distances (e.g., 2×) than a conventional lidar system. For example, an FM lidar system may detect a low reflectivity object beyond 300 meters, and a high reflectivity object beyond 400 meters.

To achieve such improvements in detection capability, the FM lidar system may use sensors (e.g., sensors 130 in FIG. 1A). In some implementations, these sensors can be single photon sensitive, meaning that they can detect the smallest amount of light possible. While an FM lidar system may, in some applications, use infrared wavelengths (e.g., 950 nm, 1550 nm, etc.), it is not limited to the infrared wavelength range (e.g., near infrared: 800 nm-1500 nm; middle infrared: 1500 nm-5600 nm; and far infrared: 5600 nm-1,000,000 nm). By operating the FM or PM lidar system in infrared wavelengths, the FM or PM lidar system can broadcast stronger light pulses or light beams while meeting eye safety standards. Conventional lidar systems are often not single photon sensitive and/or only operate in near infrared wavelengths, requiring them to limit their light output (and distance detection capability) for eye safety reasons.

Thus, by detecting an object at greater distances, an FM lidar system may have more time to react to unexpected obstacles. Indeed, even a few milliseconds of extra time could improve safety and comfort, especially with heavy vehicles (e.g., commercial trucking vehicles) that are driving at highway speeds.

Another advantage of an FM lidar system is that it provides accurate velocity for each data point instantaneously. In some implementations, a velocity measurement is accomplished using the Doppler effect which shifts frequency of the light received from the object based at least one of the velocity in the radial direction (e.g., the direction vector between the object detected and the sensor) or the frequency of the laser signal. For example, for velocities encountered in on-road situations where the velocity is less than 100 meters per second (m/s), this shift at a wavelength of 1550 nanometers (nm) amounts to the frequency shift that is less than 130 megahertz (MHz). This frequency shift is small such that it is difficult to detect directly in the optical domain. However, by using coherent detection in FMCW, PMCW, or FMQW lidar systems, the signal can be converted to the RF domain such that the frequency shift can be calculated using various signal processing techniques. This enables the autonomous vehicle control system to process incoming data faster.

Instantaneous velocity calculation also makes it easier for the FM lidar system to determine distant or sparse data points as objects and/or track how those objects are moving over time. For example, an FM lidar sensor (e.g., sensors 130 in FIG. 1A) may only receive a few returns (e.g., hits) on an object that is 300 m away, but if those return give a velocity value of interest (e.g., moving towards the vehicle at >70 mph), then the FM lidar system and/or the autonomous vehicle control system may determine respective weights to probabilities associated with the objects.

Faster identification and/or tracking of the FM lidar system gives an autonomous vehicle control system more time to maneuver a vehicle. A better understanding of how fast objects are moving also allows the autonomous vehicle control system to plan a better reaction.

Another advantage of an FM lidar system is that it has less static compared to conventional lidar systems. That is, the conventional lidar systems that are designed to be more light-sensitive typically perform poorly in bright sunlight. These systems also tend to suffer from crosstalk (e.g., when sensors get confused by each other's light pulses or light beams) and from self-interference (e.g., when a sensor gets confused by its own previous light pulse or light beam). To overcome these disadvantages, vehicles using the conventional lidar systems often need extra hardware, complex software, and/or more computational power to manage this "noise."

In contrast, FM lidar systems do not suffer from these types of issues because each sensor is specially designed to respond only to its own light characteristics (e.g., light beams, light waves, light pulses). If the returning light does not match the timing, frequency, and/or wavelength of what was originally transmitted, then the FM sensor can filter (e.g., remove, ignore, etc.) out that data point. As such, FM lidar systems produce (e.g., generates, derives, etc.) more accurate data with less hardware or software requirements, enabling safer and smoother driving.

Lastly, an FM lidar system is easier to scale than conventional lidar systems. As more self-driving vehicles (e.g., cars, commercial trucks, etc.) show up on the road, those powered by an FM lidar system likely will not have to contend with interference issues from sensor crosstalk. Furthermore, an FM lidar system uses less optical peak power than conventional lidar sensors. As such, some or all of the optical components for an FM lidar can be produced on a single chip, which produces its own benefits, as discussed herein.

3. Commercial Trucking

Figure 1B:
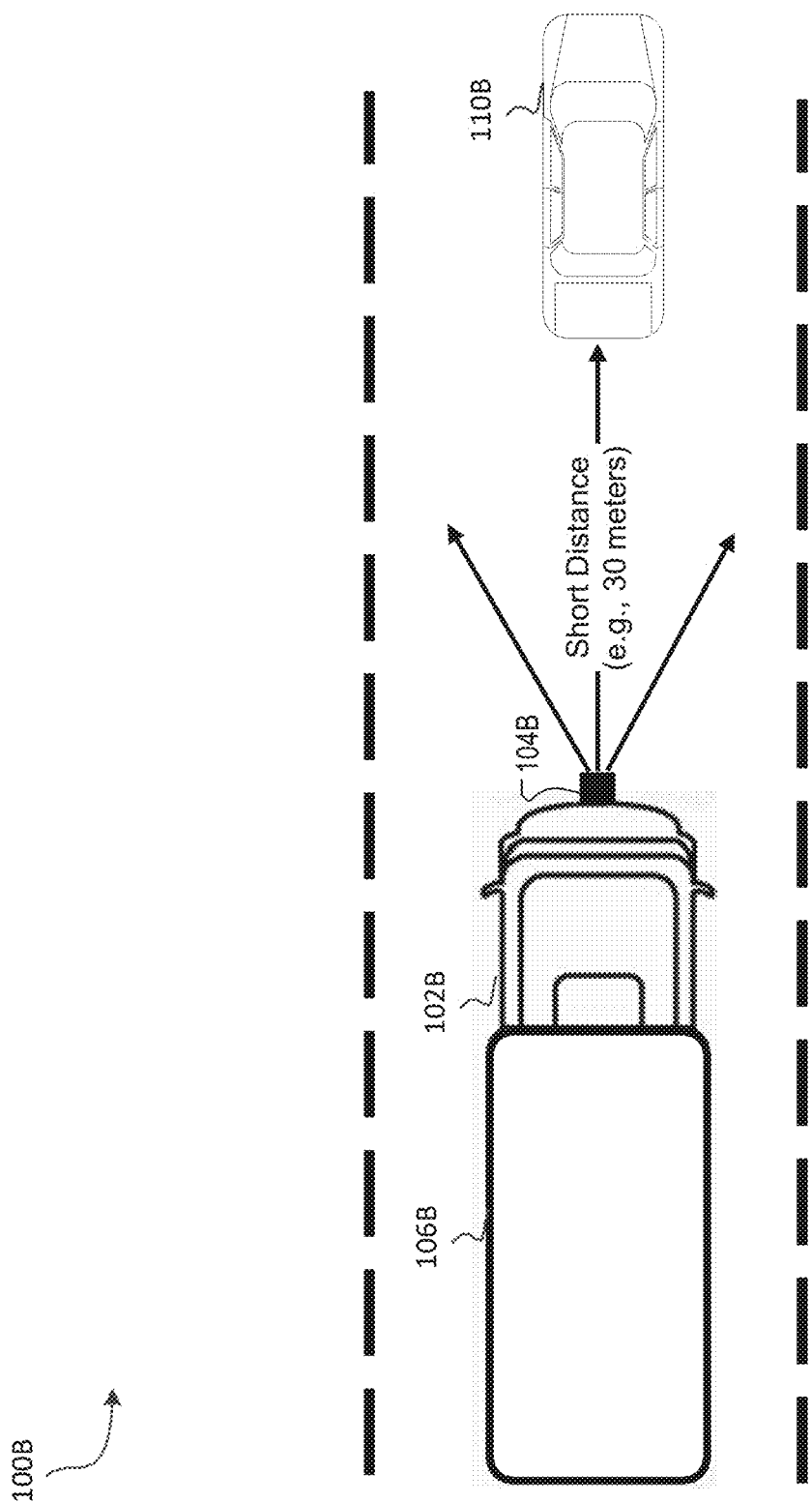
FIG. 1B is a block diagram illustrating an example of a system environment for autonomous commercial trucking vehicles, according to some implementations.

FIG. 1B is a block diagram illustrating an example of a system environment for autonomous commercial trucking vehicles, according to some implementations. The environment 100B includes a commercial truck 102B for hauling cargo 106B. In some implementations, the commercial truck 102B may include vehicles configured to long-haul freight transport, regional freight transport, intermodal freight transport (i.e., in which a road-based vehicle is used as one of multiple modes of transportation to move freight), and/or any other road-based freight transport applications. The commercial truck 102B may be a flatbed truck, a refrigerated truck (e.g., a reefer truck), a vented van (e.g., dry van), a moving truck, etc. The cargo 106B may be goods and/or produce. The commercial truck 102B may include a trailer to carry the cargo 106B, such as a flatbed trailer, a lowboy trailer, a step deck trailer, an extendable flatbed trailer, a sidekit trailer, etc.

The environment 100B includes an object 110B (shown in FIG. 1B as another vehicle) that is within a distance range that is equal to or less than 30 meters from the truck.

The commercial truck 102B may include a lidar system 104B (e.g., an FM lidar system, vehicle control system 120 in FIG. 1A, lidar system 300 in FIG. 3A, lidar system 350 in FIG. 3B, etc.) for determining a distance to the object 110B and/or measuring the velocity of the object 110B. Although FIG. 1B shows that one lidar system 104B is mounted on the front of the commercial truck 102B, the number of lidar system and the mounting area of the lidar system on the commercial truck are not limited to a particular number or a particular area. The commercial truck 102B may include any number of lidar systems 104B (or components thereof, such as sensors, modulators, coherent signal generators, etc.) that are mounted onto any area (e.g., front, back, side, top, bottom, underneath, and/or bottom) of the commercial truck 102B to facilitate the detection of an object in any free-space relative to the commercial truck 102B.

As shown, the lidar system 104B in environment 100B may be configured to detect an object (e.g., another vehicle, a bicycle, a tree, street signs, potholes, etc.) at short distances (e.g., 30 meters or less) from the commercial truck 102B.

Figure 1C:
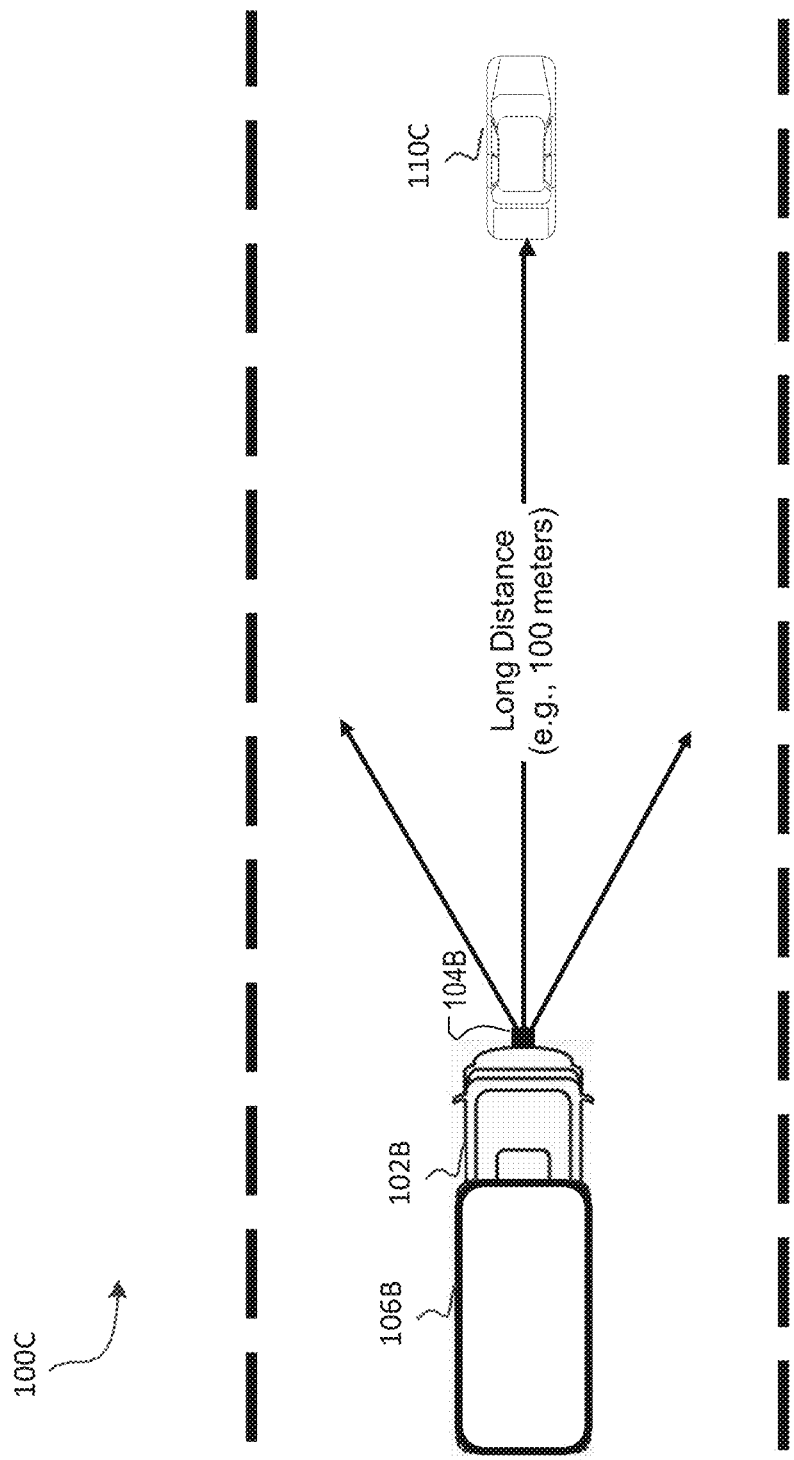
FIG. 1C is a block diagram illustrating an example of a system environment for autonomous commercial trucking vehicles, according to some implementations.

FIG. 1C is a block diagram illustrating an example of a system environment for autonomous commercial trucking vehicles, according to some implementations. The environment 100C includes the same components (e.g., commercial truck 102B, cargo 106B, lidar system 104B, etc.) that are included in environment 100B.

The environment 100C includes an object 110C (shown in FIG. 1C as another vehicle) that is within a distance range that is (i) more than 30 meters and (ii) equal to or less than 150 meters from the commercial truck 102B. As shown, the lidar system 104B in environment 100C may be configured to detect an object (e.g., another vehicle, a bicycle, a tree, street signs, potholes, etc.) at a distance (e.g., 100 meters) from the commercial truck 102B.

Figure 1D:
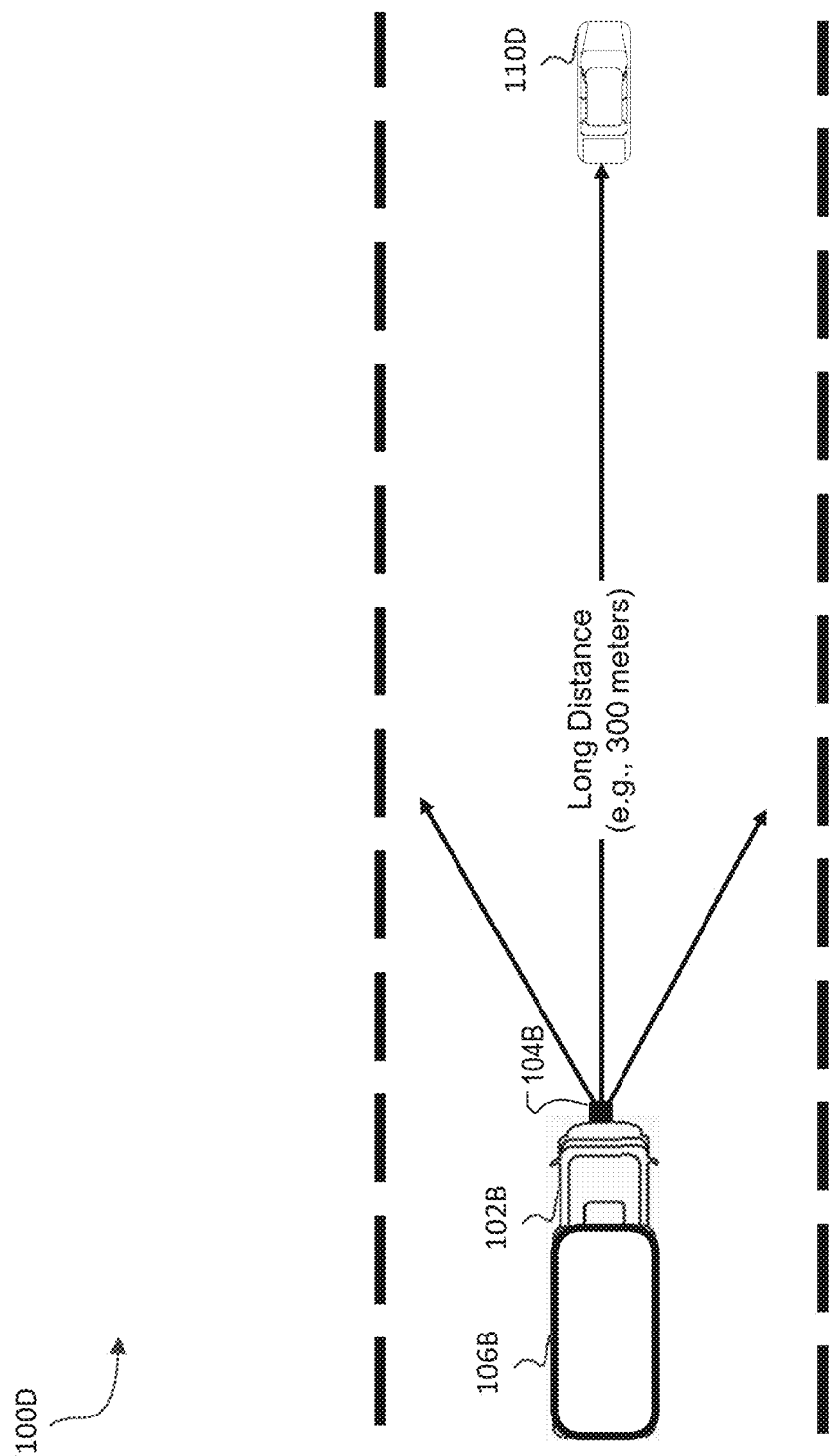
FIG. 1D is a block diagram illustrating an example of a system environment for autonomous commercial trucking vehicles, according to some implementations.

FIG. 1D is a block diagram illustrating an example of a system environment for autonomous commercial trucking vehicles, according to some implementations. The environment 100D includes the same components (e.g., commercial truck 102B, cargo 106B, lidar system 104B, etc.) that are included in environment 100B.

The environment 100D includes an object 110D (shown in FIG. 1D as another vehicle) that is within a distance range that is more than 150 meters from the commercial truck 102B. As shown, the lidar system 104B in environment 100D may be configured to detect an object (e.g., another vehicle, a bicycle, a tree, street signs, potholes, etc.) at a distance (e.g., 300 meters) from the commercial truck 102B.

In commercial trucking applications, it is important to effectively detect objects at all ranges due to the increased weight and, accordingly, longer stopping distance required for such vehicles. FM lidar systems (e.g., FMCW and/or FMQW systems) or PM lidar systems are well-suited for commercial trucking applications due to the advantages described above. As a result, commercial trucks equipped with such systems may have an enhanced ability to safely move both people and goods across short or long distances, improving the safety of not only the commercial truck but of the surrounding vehicles as well. In various implementations, such FM or PM lidar systems can be used in semi-autonomous applications, in which the commercial truck has a driver and some functions of the commercial truck are autonomously operated using the FM or PM lidar system, or fully autonomous applications, in which the commercial truck is operated entirely by the FM or lidar system, alone or in combination with other vehicle systems.

4. Continuous Wave Modulation and Quasi-Continuous Wave Modulation

In a lidar system that uses CW modulation, the modulator modulates the laser light continuously. For example, if a modulation cycle is 10 seconds, an input signal is modulated throughout the whole 10 seconds. Instead, in a lidar system that uses quasi-CW modulation, the modulator modulates the laser light to have both an active portion and an inactive portion. For example, for a 10 second cycle, the modulator modulates the laser light only for 8 seconds (sometimes referred to as, "the active portion"), but does not modulate the laser light for 2 seconds (sometimes referred to as, "the inactive portion"). By doing this, the lidar system may be able to reduce power consumption for the 2 seconds because the modulator does not have to provide a continuous signal.

In Frequency Modulated Continuous Wave (FMCW) lidar for automotive applications, it may be beneficial to operate the lidar system using quasi-CW modulation where FMCW measurement and signal processing methodologies are used, but the light signal is not in the on-state (e.g., enabled, powered, transmitting, etc.) all the time. In some implementations, Quasi-CW modulation can have a duty cycle that is equal to or greater than 1% and up to 50%. If the energy in the off-state (e.g., disabled, powered-down, etc.) can be expended during the actual measurement time then there may be a boost to signal-to-noise ratio (SNR) and/or a reduction in signal processing requirements to coherently integrate all the energy in the longer time scale.

5. A LIDAR System Using a Depolarization Ratio of a Return Signal

Figure 2:
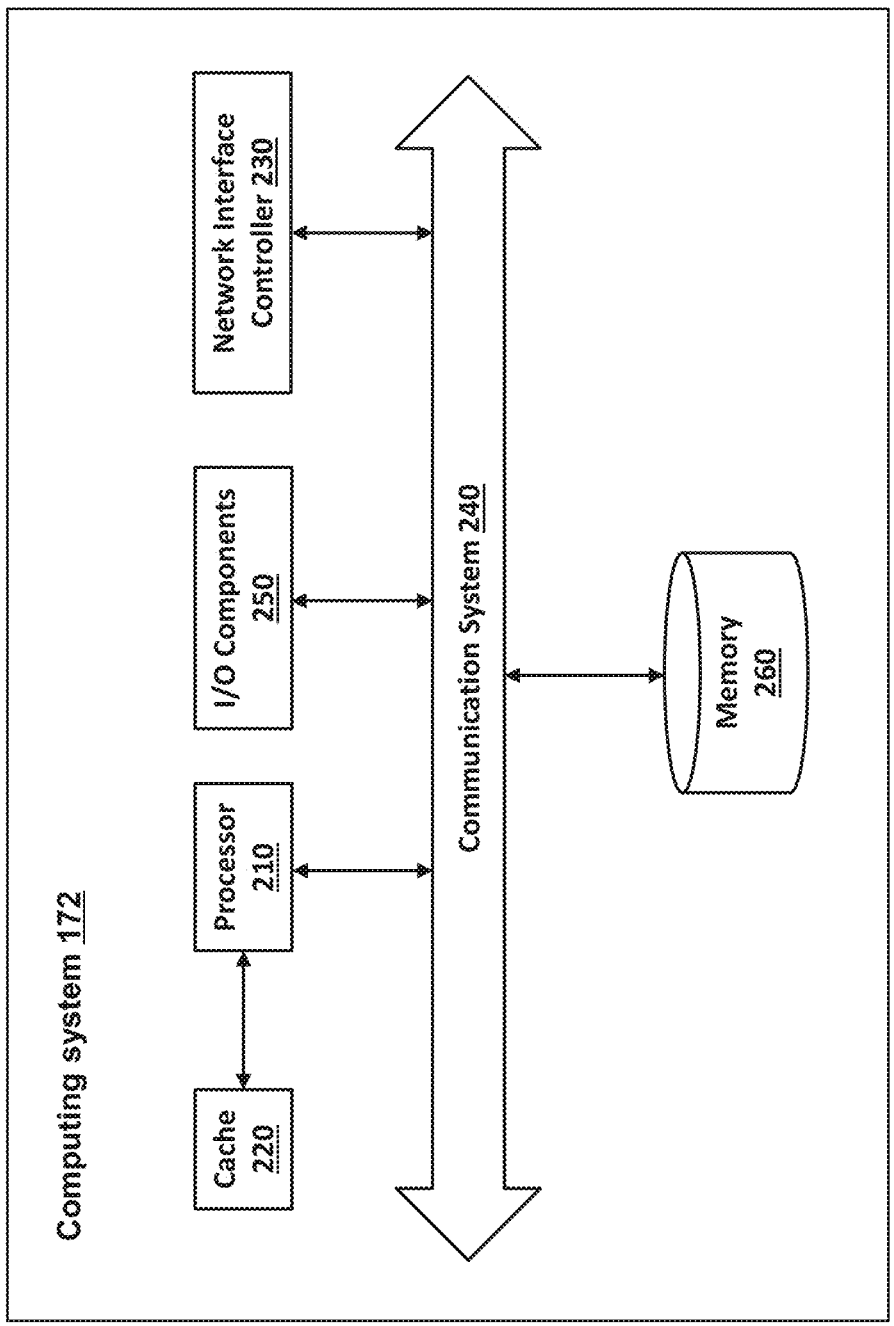
FIG. 2 is a block diagram illustrating an example of a computing system according to some implementations.

FIG. 2 is a block diagram illustrating an example of a computing system according to some implementations.

Referring to FIG. 2, the illustrated example computing system 172 includes one or more processors 210 in communication, via a communication system 240 (e.g., bus), with memory 260, at least one network interface controller 230 with network interface port for connection to a network (not shown), and other components, e.g., an input/output ("I/O") components interface 450 connecting to a display (not illustrated) and an input device (not illustrated). Generally, the processor(s) 210 will execute instructions (or computer programs) received from memory. The processor(s) 210 illustrated incorporate, or are directly connected to, cache memory 220. In some instances, instructions are read from memory 260 into the cache memory 220 and executed by the processor(s) 210 from the cache memory 220.

In more detail, the processor(s) 210 may be any logic circuitry that processes instructions, e.g., instructions fetched from the memory 260 or cache 220. In some implementations, the processor(s) 210 are microprocessor units or special purpose processors. The computing device 400 may be based on any processor, or set of processors, capable of operating as described herein. The processor(s) 210 may be single core or multi-core processor(s). The processor(s) 210 may be multiple distinct processors.

The memory 260 may be any device suitable for storing computer readable data. The memory 260 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, or Blu-Ray® discs). A computing system 172 may have any number of memory devices as the memory 260.

The cache memory 220 is generally a form of computer memory placed in close proximity to the processor(s) 210 for fast read times. In some implementations, the cache memory 220 is part of, or on the same chip as, the processor(s) 210. In some implementations, there are multiple levels of cache 220, e.g., L2 and L3 cache layers.

The network interface controller 230 manages data exchanges via the network interface (sometimes referred to as network interface ports). The network interface controller 230 handles the physical and data link layers of the OSI model for network communication. In some implementations, some of the network interface controller's tasks are handled by one or more of the processor(s) 210. In some implementations, the network interface controller 230 is part of a processor 210. In some implementations, a computing system 172 has multiple network interfaces controlled by a single controller 230. In some implementations, a computing system 172 has multiple network interface controllers 230. In some implementations, each network interface is a connection point for a physical network link (e.g., a cat-5 Ethernet link). In some implementations, the network interface controller 230 supports wireless network connections and an interface port is a wireless (e.g., radio) receiver/transmitter (e.g., for any of the IEEE 802.11 protocols, near field communication "NFC", Bluetooth, ANT, or any other wireless protocol). In some implementations, the network interface controller 230 implements one or more network protocols such as Ethernet. Generally, a computing device 172 exchanges data with other computing devices via physical or wireless links through a network interface. The network interface may link directly to another device or to another device via an intermediary device, e.g., a network device such as a hub, a bridge, a switch, or a router, connecting the computing device 172 to a data network such as the Internet.

The computing system 172 may include, or provide interfaces for, one or more input or output ("I/O") devices. Input devices include, without limitation, keyboards, microphones, touch screens, foot pedals, sensors, MIDI devices, and pointing devices such as a mouse or trackball. Output devices include, without limitation, video displays, speakers, refreshable Braille terminal, lights, MIDI devices, and 2-D or 3-D printers.

Other components may include an I/O interface, external serial device ports, and any additional co-processors. For example, a computing system 172 may include an interface (e.g., a universal serial bus (USB) interface) for connecting input devices, output devices, or additional memory devices (e.g., portable flash drive or external media drive). In some implementations, a computing device 172 includes an additional device such as a co-processor, e.g., a math co-processor can assist the processor 210 with high precision or complex calculations.

FIG. 3A is a block diagram illustrating an example of a lidar system according to some implementations. In some implementations, a lidar system 300 may be the lidar sensor 136 (see FIG. 1A). The lidar system 300 may include a laser 302, a modulator 304, circulator optics 306, a scanner 308, a polarization beam splitter (PBS) 312, a first detector 314, a second detector 316, and a processing system 318. The PBS may be a polarization beam splitters/combiners (PBSC). In some implementations, the lidar system 300 may be a coherent FMCW lidar.

In some implementations, the laser 302 may emit a laser output (LO) signal as carrier wave 303. A splitter (not illustrated) may split the unmodulated LO signal into the carrier wave 303, an LO signal 321, and an LO signal 323, which are in the same polarization state (referred to as first polarization state).

In some implementations, the modulator 304 may receive the carrier wave 303 and phase or frequency modulate the carrier wave 303 to produce a modulated optical signal 305 which is in the first polarization state. The modulator 304 may be a frequency shifting device (acousto-optic modulator). The modulated optical signal 305 may be generated using time delay of a local oscillator waveform modulation. The modulator 304 may use frequency modulation (FM) so that the (FM) lidar system can encode an optical signal and scatter the encoded optical signal into free-space using optics. The FM lidar system may use a continuous wave (referred to as, "FMCW lidar") or a quasi-continuous wave (referred to as, "FMQW lidar"). The modulator 304 may use phase modulation (PM) so that the (PM) lidar system can encode an optical signal and scatter the encoded optical signal into free-space using optics. In some implementations, the modulator 304 may use polarization modulation.

In some implementations, the modulated optical signal 305 may be shaped through the circulator optics 306 into a signal 307 which is input to the scanner 308. The circulator optics 306 may be an optical circulator (e.g., a fiber coupled circulator) but is not limited thereto. For example, the circulator optics 306 may be an optical isolator. In some implementations, the circulator optics 306 may be a free-space pitch catch optic (e.g., a pitch optic and a catch optic).

In some implementations, a transmit signal 309 may be transmitted through the scanner 308 to illuminate an object 310 (or an area of interest). The transmit signal 309 may be in the first polarization state. In some implementation, the scanner 308 may include scanning optics (not shown), for example, a polygon scanner with a plurality of mirrors or facets). The scanner 308 may receive a return signal 311 reflected by the object 310. The return signal 311 may contain a signal portion in the first polarization state and/or a signal portion in a different polarization state (referred to as "second polarization state"). The first polarization state is orthogonal to the second polarization state. The scanner 308 may redirect the return signal 311 into a return signal 313.

In some implementations, the return signal 313 may be further redirected by the circulator optics 306 into a return signal 315 to be input to the PBS 312. The PBS 312 may split and polarize the return signal 315 into a first polarized optical signal 317 with the first polarization state and a second polarized optical signal 319 with the second polarization state. The circulator optics 306 and the PBS 312 may be integrated into a polarization beam splitter/combiner (PBSC).

In some implementations, the first detector 314 may be a single paired or unpaired detector, or a 1 dimensional (1D) or 2 dimensional (2D) array of paired or unpaired detectors. The first detector 314 may receive the LO signal 321 as a reference signal. The first detector 314 may be an optical detector configured to detect an optical signal. The first detector 314 may detect a first polarized signal (e.g., the first polarized optical signal) and output or generate a first electrical signal 325.

In some implementations, the second detector 316 may be a single paired or unpaired detector, or a 1 dimensional (1D) or 2 dimensional (2D) array of paired or unpaired detectors. The second detector 316 may receive the LO signal 323 as a reference signal. The second detector 316 may be an optical detector configured to detect an optical signal. The second detector 316 may detect a second polarized signal (e.g., the second polarized optical signal 319) and output or generate a second electrical signal 327. The two electrical signals may indicate respective separate images of the object in different polarization states.

In some implementations, the processing system 318 may have similar configuration to the computing system 172 (see FIG. 2). The processing system 318 may be one or more computing systems each having similar configuration to the computing system 172. The processing system 318 may receive the first electrical signal 325 and the second electrical signal 327 and calculate depolarization ratios (as defined below) based on the electrical signals. The first electrical signal 325 represents an image of the object in a first channel representing the first polarization state, and the second electrical signal 347 represents an image of the object in a second channel representing the second polarization state. The processing system 318 may process the first electrical signal 325 in the first channel and the second electrical signal 327 in the second channel.

In some implementations, the processing system 318 (or a processor thereof) may be configured to compare the signals with the two polarization states (e.g., the electrical signals 325, 327) to estimate how much the object (or target) has depolarized the return signal (by calculating a depolarization ratio as defined below). In response to detecting two polarized signals, one or more detectors (e.g., the first and second detectors 314, 316) may generate corresponding two electrical signals (e.g., electrical signals 325, 327 in FIG. 3A) in separate channels so that the electrical signals can be processed independently by the processing system 318. The lidar system (e.g., the lidar system 300) may provide two receive/digitizer channels (e.g., the first and second channels) for performing independent signal processing of two beams with different polarization states (e.g., first polarized optical signal 317 and second polarized optical signal 319 in FIG. 3A). In this manner, the system can process, in two independent channels, independent streams from a point of cloud.

In some implementations, the processing system 318 (or a processor thereof) may be configured to calculate a depolarization ratio by calculating a ratio of reflectivity between the first polarized optical signal 317 and the second polarized optical signal 319. The lidar system may calculate a depolarization ratio by calculating a ratio of reflectivity between separate images of the object in different polarization states (e.g., images represented by the first and second electrical signals). The lidar system may calculate a depolarization ratio based on the equation below.

$$\text{Depolarization Ratio} = \frac{SNR(\text{channel\_}p)}{SNR(\text{channel\_}d)} \quad \text{(Equation 1)}$$

where SNR(channel_p) is a signal-to-noise ratio (SNR) of an image of the object in a polarization channel (e.g., the first channel representing the first polarization state), and SNR (channel_d) is an SNR of an image of the object in a depolarization channel (e.g., the second channel representing the second polarization state). In some implementations, SNR(channel_p) is an average SNR of the image of the object in the polarization channel, and SNR(channel_d) is an average SNR of the image of the object in the depolarization channel.

In some implementations, the depolarization ratio may be calculated using a ratio of average reflectivity between two images in different polarization states, where an average reflectivity is defined over some region of a space (e.g., over some voxels). An average reflectivity of a plurality of samples may be calculated over one or more voxels. An average reflectivity of a plurality of samples over one or more voxels may be affected by selection of parameters, for example, spatial resolution or precision (e.g., dimension of a voxel). In general, an average over a smaller voxel may have fewer contributions to an average over the whole image of the object, while it may have more contribution to contrast of the image so as to make the object more distinguishable. Selection of proper parameters (e.g., dimension of a voxel, number of samples, etc.) to calculate an average reflectivity can provide another dimension from pure reflectivity measurement, thereby increasing the value of data. Characteristics of the calculated average reflectivity may be different from those of measured values of reflectivity. For example, each measurement value is not correlated while an average may be correlated. In some implementations, a voxel of 5 cm×10 cm dimension may be used. The number of samples for averaging may be less than 100. For example, 5 or 12 samples may be used.

In some implementations, the processing system 318 may perform a post processing on the electrical signals 325 and 327 in each channel to produce a respective image of the object in the respective polarization (e.g., a first image in the first polarization state and a second image in the second polarization state). The processing system 318 may calculate an average reflectivity of each image of the object over a plurality of samples. The processing system 318 may perform a spatial averaging per voxel. For example, the processing system 318 may include a hash-based voxelizer to efficiently generate a plurality of voxels representing the object in a polarization state. With a hash-based voxelizer, the processing system 318 can perform a quick search for a voxel. The processing system 318 may calculate an average reflectivity within each voxel of the plurality of voxels over a plurality of samples. The processing system 318 may calculate a ratio of the average reflectivity within each voxel between two channels (e.g., the electrical signal 325 in the first channel and the electrical signal 327 in the second channel).

In some implementations, a light detection and ranging (lidar) system may include a transmitter (e.g., scanner 308 in FIG. 3A) configured to transmit a transmit signal (e.g., transmit signal 311 in FIG. 3A) from a laser source (e.g., laser 302 in FIG. 3A), a receiver (e.g., scanner 308 in FIG. 3A) configured to receive a return signal (e.g., return signal 313 in FIG. 3A) reflected by an object (e.g., object 310 in FIG. 3A), one or more optics (e.g., circulator optics 306, PBS 312 in FIG. 3A), and a processor (e.g., a processor of the processing system 318 in FIG. 3A). The one or more optics may be configured to generate a first polarized signal of the return signal (e.g., first polarized optical signal 317 in FIG. 3A) with a first polarization, and generate a second polarized signal of the return signal (e.g., second polarized optical signal 319 in FIG. 3A) with a second polarization that is orthogonal to the first polarization. The transmitter and the receiver may be a single transceiver (e.g., a single scanner 308 in FIG. 3A).

In some implementations, the one or more optics may include a polarization beam splitter (e.g., PBS 312 in FIG. 3A), a first detector (e.g., detector 314 in FIG. 3A), and a second detector (e.g., detector 316 in FIG. 3A), thereby providing a polarization-sensitive lidar (e.g., lidar system 300 in FIG. 3A). The PBS may be configured to split out the return signal into the first polarized signal and the second polarized signal so that they can be detected independently. The PBS may be configured to polarize the return signal with the first polarization to generate the first polarized signal (e.g., first polarized optical signal 317 in FIG. 3A), and polarize the return signal with the second polarization to generate a second polarized signal (e.g., second polarized optical signal 319 in FIG. 3A). The first detector may be configured to detect the first polarized signal. The second detector may be configured to detect the second polarized signal.

In some implementations, the signals split into the two polarization states can then be compared (by calculating a ratio of reflectivity between them) to estimate how much the object (or target) has depolarized the return signal. In response to detecting two polarized signals, one or more detectors may generate corresponding two electrical signals (e.g., electrical signals 325, 327 in FIG. 3A) in separate channels so that the electrical signals can be processed independently by a processing system (e.g., processing system 318 in FIG. 3A). A system may have two beams of polarization sensitive lidar (e.g., first polarized optical signal 317 and second polarized optical signal 319 in FIG. 3A), each of which has two receive/digitizer channels (e.g., the first and second channels) for independent signal processing (e.g., signal processing by the processing system 318 in FIG. 3A). The system may process, in two independent channels, independent streams from a point of cloud.

FIG. 3B is a block diagram illustrating another example of a lidar system according to some implementations. In some implementations, a lidar system 350 may be the lidar sensor 136 (see FIG. 1A). Referring to FIG. 3B, each of the laser 302, the modulator 304, the circulator optics 306, the scanner 308, and the polarization beam splitter (PBS) 312 of the lidar system 350 may have the same configurations as or similar configurations to those described with reference to FIG. 3A. The lidar system 350 may further include a detector 354, a shifter 356, and a processing system 368.

In some implementations, the detector 354 may be a single paired or unpaired detector. The first detector 354 may receive an LO signal 355 from the laser 302 as a reference signal. The detector 354 may be an optical detector configured to detect an optical signal. The detector 354 may detect the first polarized optical signal 317 and output or generate a first electrical signal 359.

In some implementations, the shifter 356 may be a frequency shifter or a frequency shifting device. For example, the shifter 356 may be an acousto-optic frequency shifter. The shifter 356 may receive the second polarized optical signal 319 and generate a frequency-shifted optical signal 357 which is directed to the detector 354. The detector 354 may the frequency-shifted optical signal 357 and output or generate a second electrical signal 361.

In some implementations, the processing system 368 may have similar configuration to the processing system 318 (see FIG. 3A). The processing system 368 may receive the first electrical signal 359 and the second electrical signal 361 and calculate depolarization ratios (as defined above) based on the electrical signals. The first electrical signal 359 represents an image of the object in a first channel representing the first polarization state, and the second electrical signal 361 represents an image of the object in a second channel representing the second polarization state. The processing system 368 may process the first electrical signal 359 in the first channel and the second electrical signal 361 in the second channel.

In some implementations, a lidar system (e.g., the lidar system 350 in FIG. 3B) may include a single detector (e.g., the single detector 354 in FIG. 3B) configured to detect two polarized signals (e.g., the first and second polarized optical signals 317, 319) from the return signal (e.g., signals 311, 313, 315) using a splitter (e.g., PBS 312) and a phase shifter (e.g., shifter 356 in FIG. 3B) by multiplexing the return signal into the single detector. The phase shifter (e.g., shifter 356 in FIG. 3B) may be configured to shift a phase of the second polarized signal (e.g., the second polarized optical signal 319). The single detector may be configured to detect the first polarized signal (e.g., the second polarized optical signal 317), and detect the phase-shifted second polarized signal (e.g., the second polarized optical signal 319).

FIG. 3A and FIG. 3B show examples of coherent lidar systems which can locate objects by mixing light reflected back from the objects with light from a local oscillator (LO). The present disclosure is not limited thereto, and in some implementations, direct detect (or pulsed) lidar systems can be used to calculate depolarization ratios. In some implementations, hardware configuration of the direct detect lidar systems for a polarimetric/depolarization ratio measurement may be different from that of coherent lidar systems. For example, a direct detect lidar system may need to specifically polarize an outgoing pulse and add additional optics to make a measurement specific to different polarization states of the return signal. With the additional optics, the direct detect lidar system can perform polarization of the return signal. In coherent lidar systems, on the other hand, the measured signal may be inherently the part of the return signal in the same polarization state of a local oscillator (LO).

FIG. 4A to FIG. 4J are images illustrating various examples of depolarization ratio data according to some implementations.

Figure 4A:
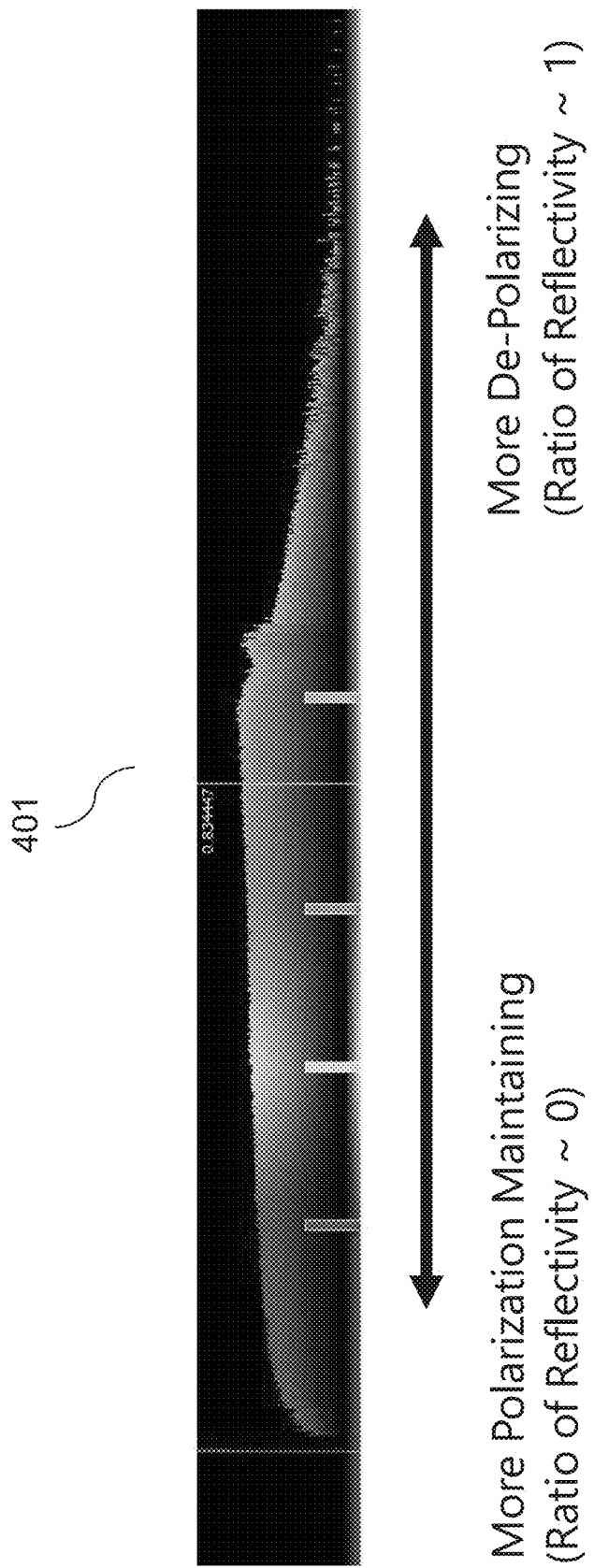
FIG. 4A to FIG. 4J are images illustrating various examples of depolarization ratio data according to some implementations.

FIG. 4A shows an image representing a color scheme 401 used in depolarization ratio images shown in FIG. 4B to FIG. 4J. According to the color scheme, more red colors indicate that the object is more polarizing maintaining (i.e., depolarization ratio is closer to 0), while more light blue colors indicate that the object is more depolarizing (i.e., depolarization ratio is closer to 1).

Figure 4B:
Figure 4B:
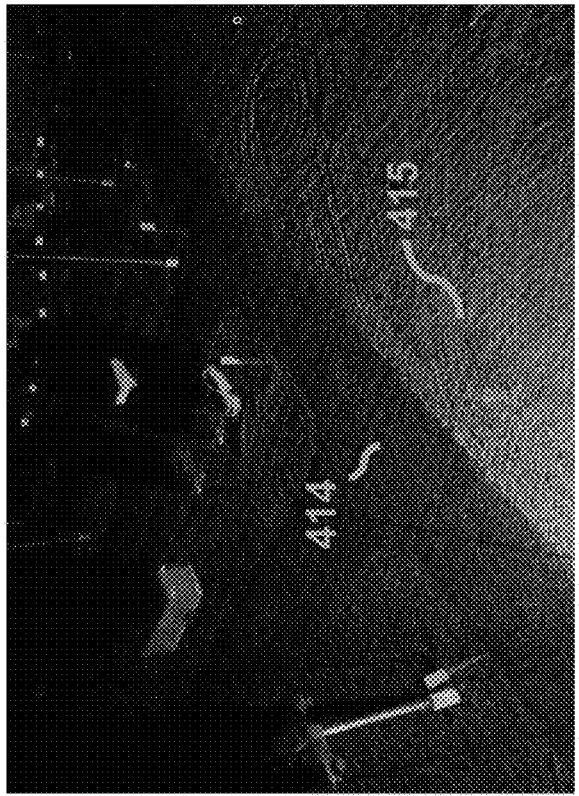
Figure 4B:

FIG. 4B shows a color image 411 representing an original scene, an image 412 representing a reflectivity of the original scene, and an image 413 representing a depolarization ratio of the original scene. FIG. 4B shows that an asphalt road and gravel have similar reflectivity so are not clearly distinguished in the reflectivity image 412, while the asphalt road 414 and the gravel 415 have different depolarization ratios so are clearly distinguished in the depolarization ratio image 413. It is also shown in FIG. 4B that according to the color scheme of FIG. 4A, the asphalt road 414 is more polarization maintaining while the gravel 415 is more depolarizing.

Figure 4C:
Figure 4C:
Figure 4C:

FIG. 4C shows a color image 421 representing an original scene, an image 422 representing a reflectivity of the original scene, and an image 423 representing a depolarization ratio of the original scene. FIG. 4C shows that an asphalt road and lane markings have similar reflectivity so are not clearly distinguished in the reflectivity image 422, while the asphalt road 424 and the lane markings 425 have different depolarization ratios so are clearly distinguished in the depolarization ratio image 423. It is also shown in FIG. 4C that according to the color scheme of FIG. 4A, the asphalt road 424 is more polarization maintaining while the lane markings 425 is more depolarizing.

Figure 4D:
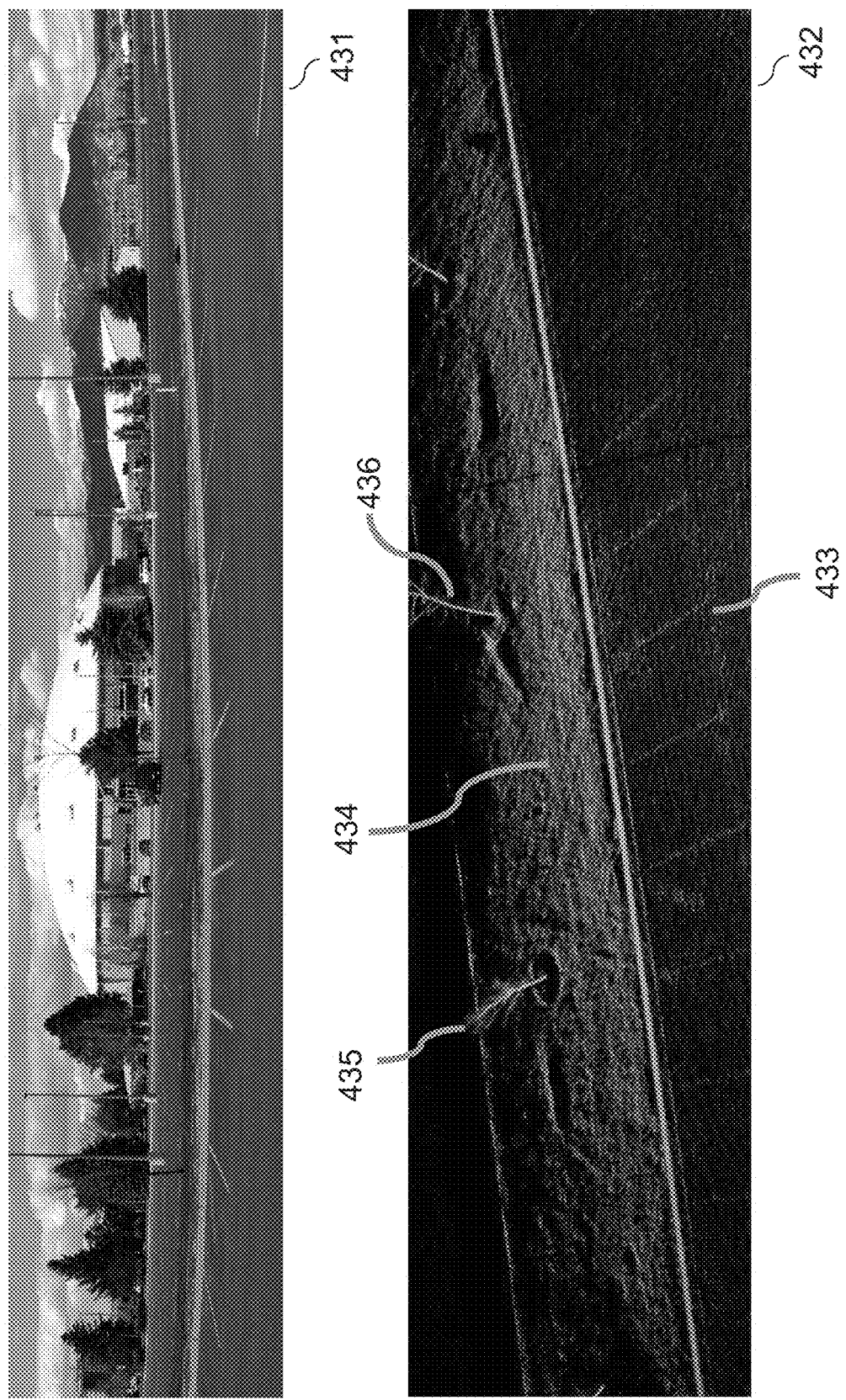

FIG. 4D shows a color image 431 representing an original scene and an image 432 representing a depolarization ratio of the original scene. FIG. 4D shows that an asphalt road 433 is more polarization maintaining while grass 434 is more depolarizing, which can be useful for detecting a pavement. FIG. 4D also shows that a plant 435 is more polarization maintaining while a plant 436 is more depolarizing. It was discovered by the inventors that such a low depolarization ratio of the plant 435 is falsely calculated due to a split-pixel processing artifact problem. In general, sparse objects or targets (e.g., bushes, tree branches, etc.) may likely produce a false measurement due to split-pixel processing artifacts.

To address this split-pixel processing artifact problem, in some implementations, such sparse object may be detected and discarded using a principal component analysis (PCA). A system (e.g., the processing system 318, 358 in FIG. 3A and FIG. 3B) may calculate or obtain a distribution of points in a voxel. The system may perform PCA to determine, based on the point distributions, whether the points in a plane are either (1) flat, spread out, or solid or (2) sparse or linearly arranged. In response to determining that the points in a plane are (2) sparse or linearly arranged, the system may discard the points from measurements or calculation of depolarization ratios. In performing PCA, the system may identify eigenvalues from a covariance matrix of the distribution and determine the sparsity of the object (or points) based on some number of largest eigenvalues.

Figure 4E:
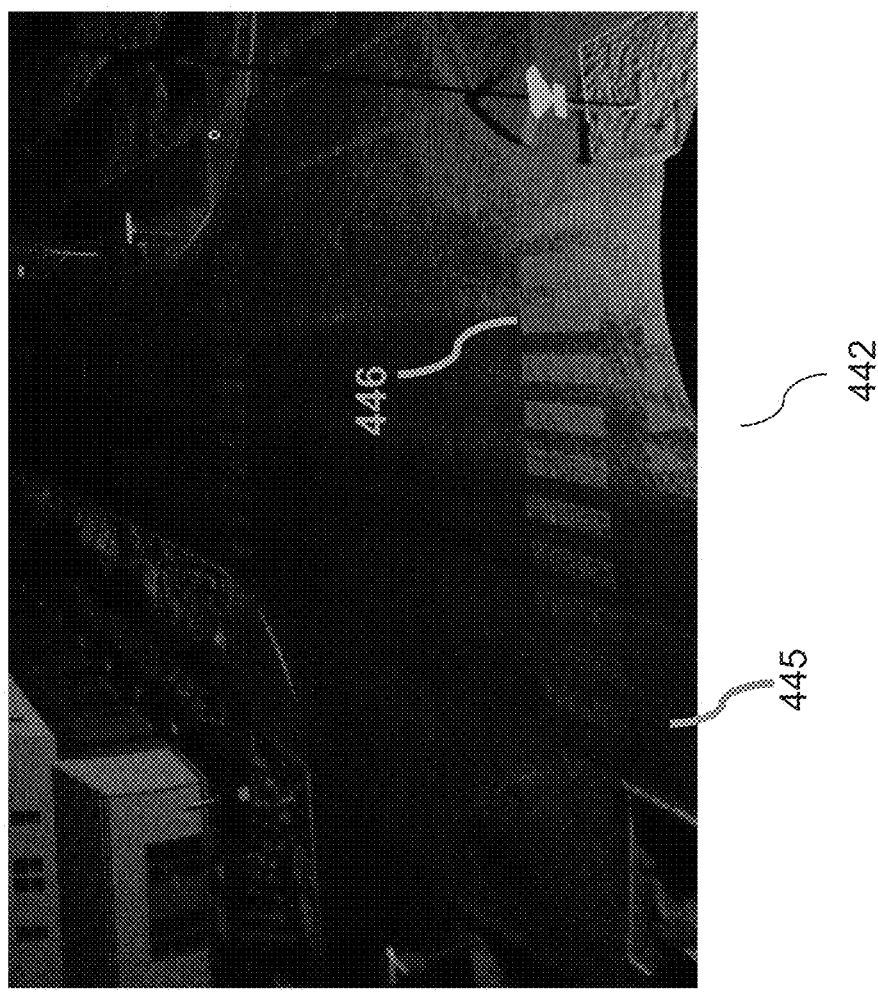
Figure 4E:
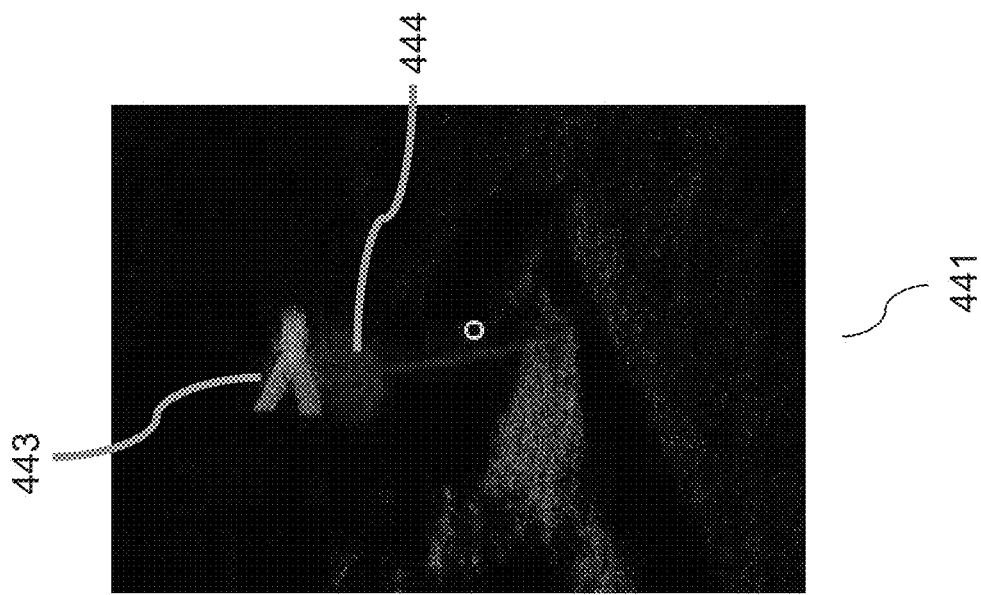

FIG. 4E shows images 441 and 442 each representing a depolarization ratio of a street scene. In the image 441, it is shown that a metal back of stop sign 444 and its post are more polarization maintaining while a street sign (or signage) 443 above them is more depolarizing. In the image 442, it is shown that an asphalt road 445 (e.g., black asphalt road) is more polarization maintaining while lane markings 446 (e.g., white paint on the road) is more depolarizing.

Figure 4F:
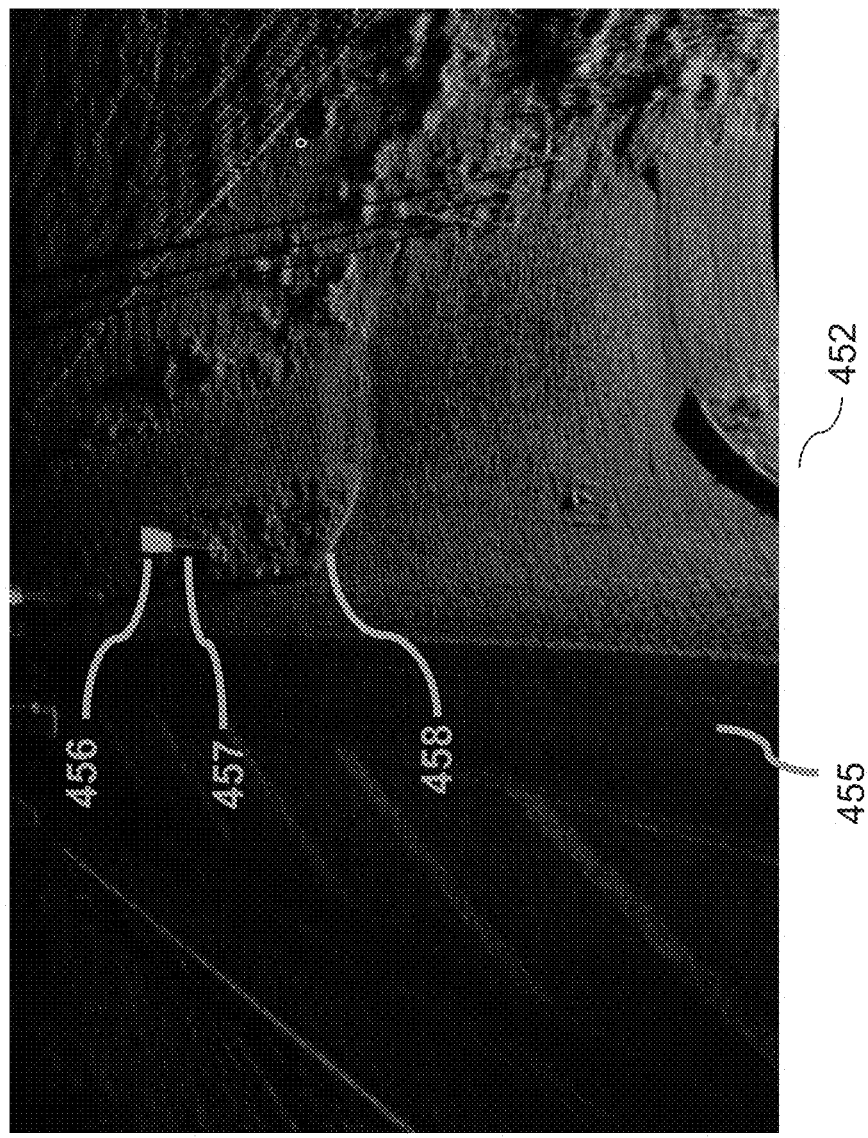
Figure 4F:
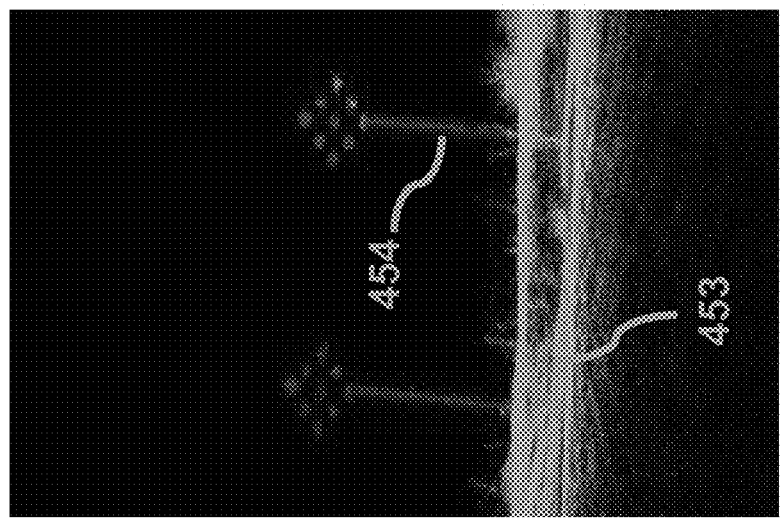

FIG. 4F shows images 451 and 452 each representing a depolarization ratio of a street scene. It is shown that a sign post 454 (in the image 451) and a sign post 457 (in the image 452) are more polarization maintaining while a front of a sign 456 (in the image 452) is more depolarizing. It is also shown that an asphalt road 455 (in the image 452) is more polarization maintaining while grass 453 (in the image 451) and concrete sidewalk or curb 458 (in the image 452) are more depolarizing.

Figure 4G:
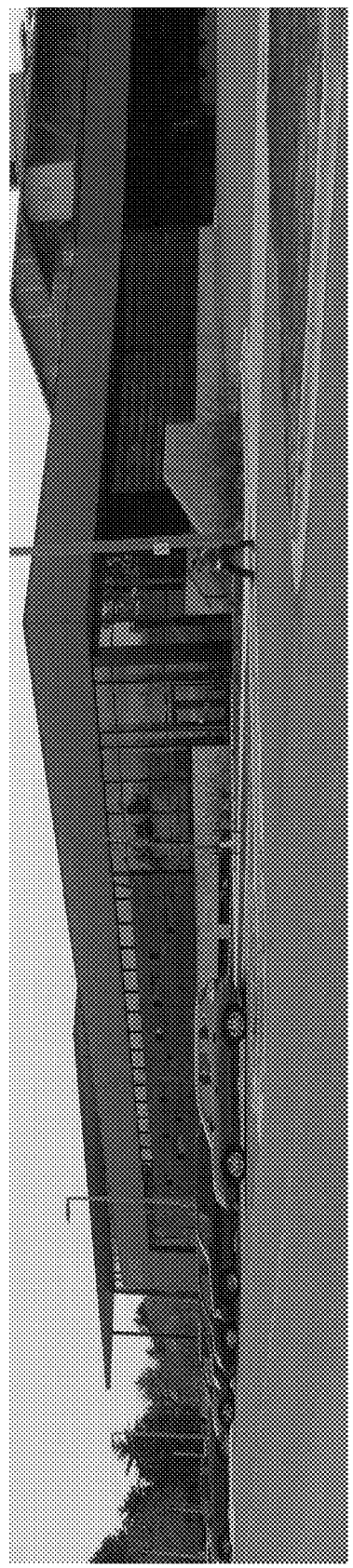
Figure 4G:
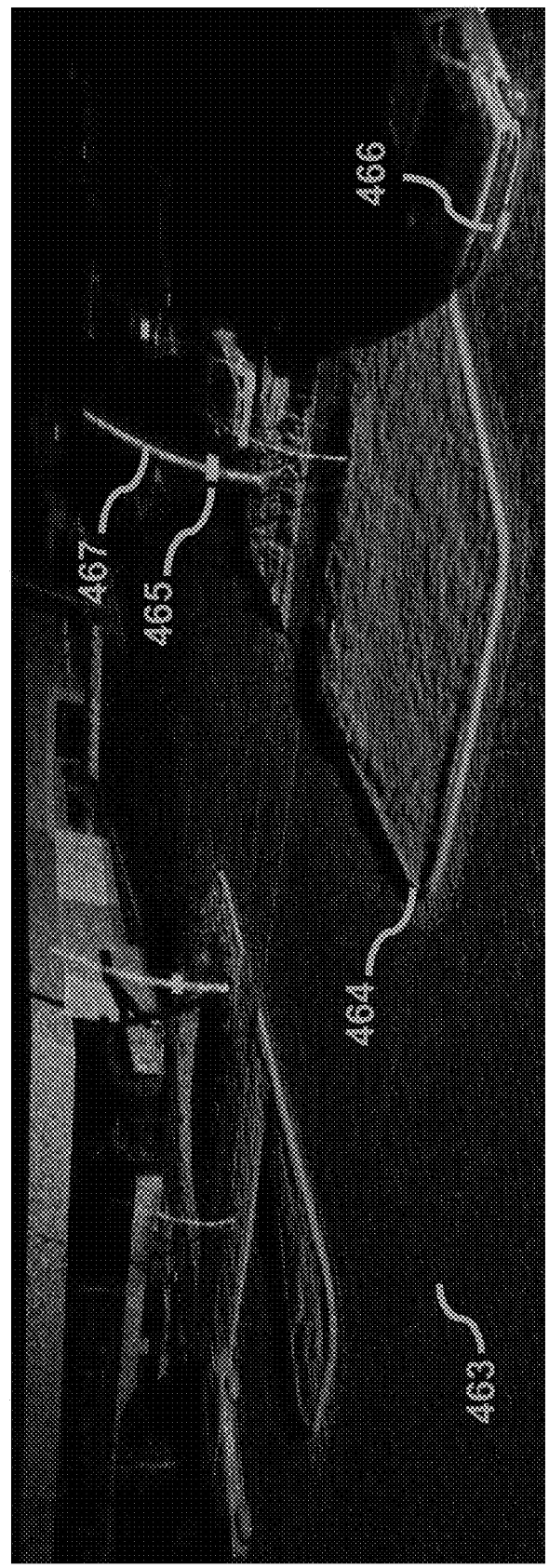

FIG. 4G shows a color image 461 representing an original scene and an image 462 representing a depolarization ratio of the original scene. It is shown in the image 462 that a metal post 467) is more polarization maintaining while a front of a sign 465 is more depolarizing. It is also shown that an asphalt road 463 is more polarization maintaining while concrete sidewalk or curb 464 is more depolarizing. It is also shown that a license plate 466 of a car is more depolarizing while other surfaces of the car (e.g., headlights) are more polarization maintaining.

Figure 4H:
Figure 4H:
Figure 4H:

FIG. 4H shows a color image 470 representing an original scene and images 471, 472 each representing a depolarization ratio of the original scene. It is shown that a sign post 474 and a back of its sign (in the image 471), a sign post 478 (in the image 472) and chain link fence 477 (in the image 472) are more polarization maintaining while a front of a sign 479 (in the image 472) is more depolarizing. It is also shown that and trees 473, 475 and grass 476 (in the image 472) are more depolarizing.

Figure 4I:
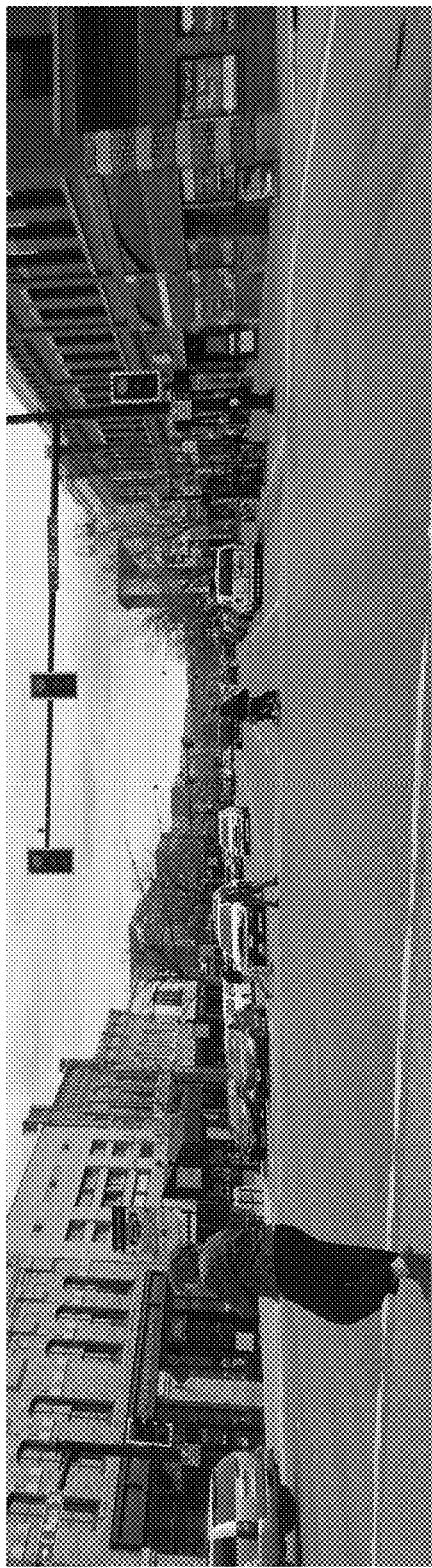
Figure 4I:
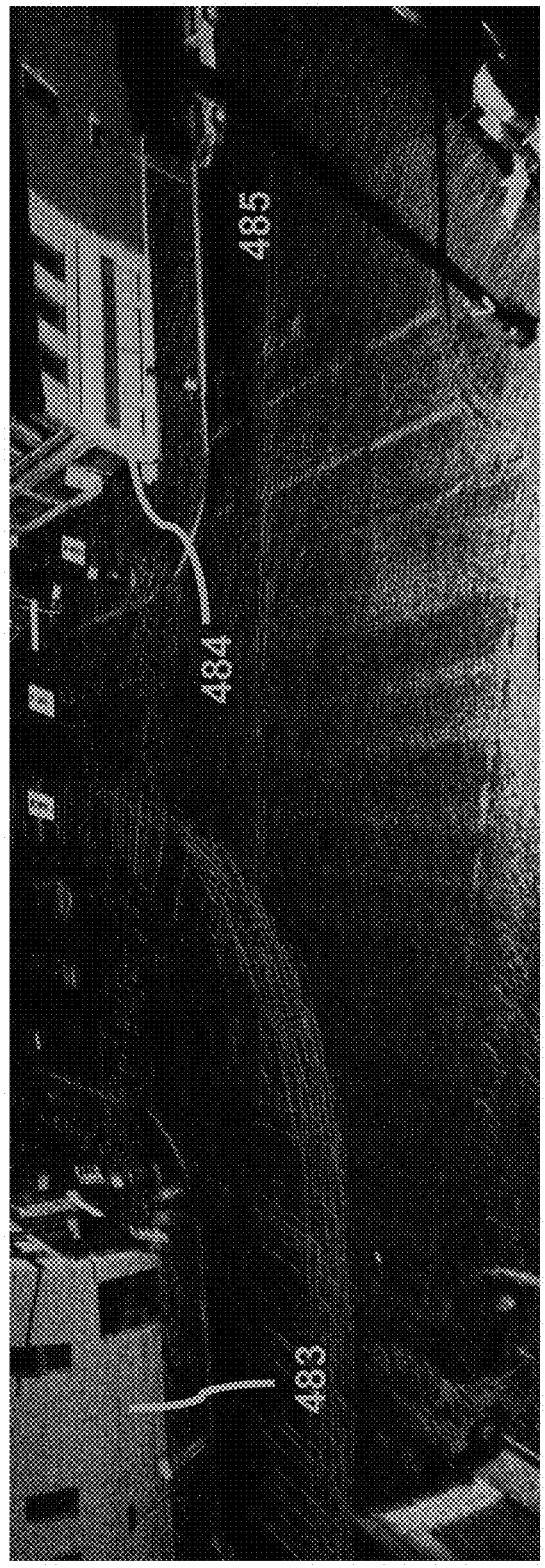

FIG. 4I shows a color image 481 representing an original scene and an image 482 representing a depolarization ratio of the original scene. It is shown in the image 482 that different building materials (e.g., building surfaces 483, 484, 485) have difference depolarization ratios.

Figure 4J:
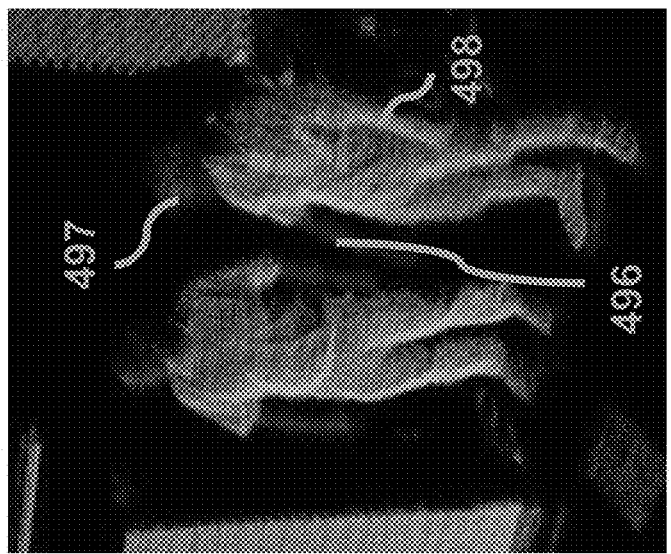
Figure 4J:
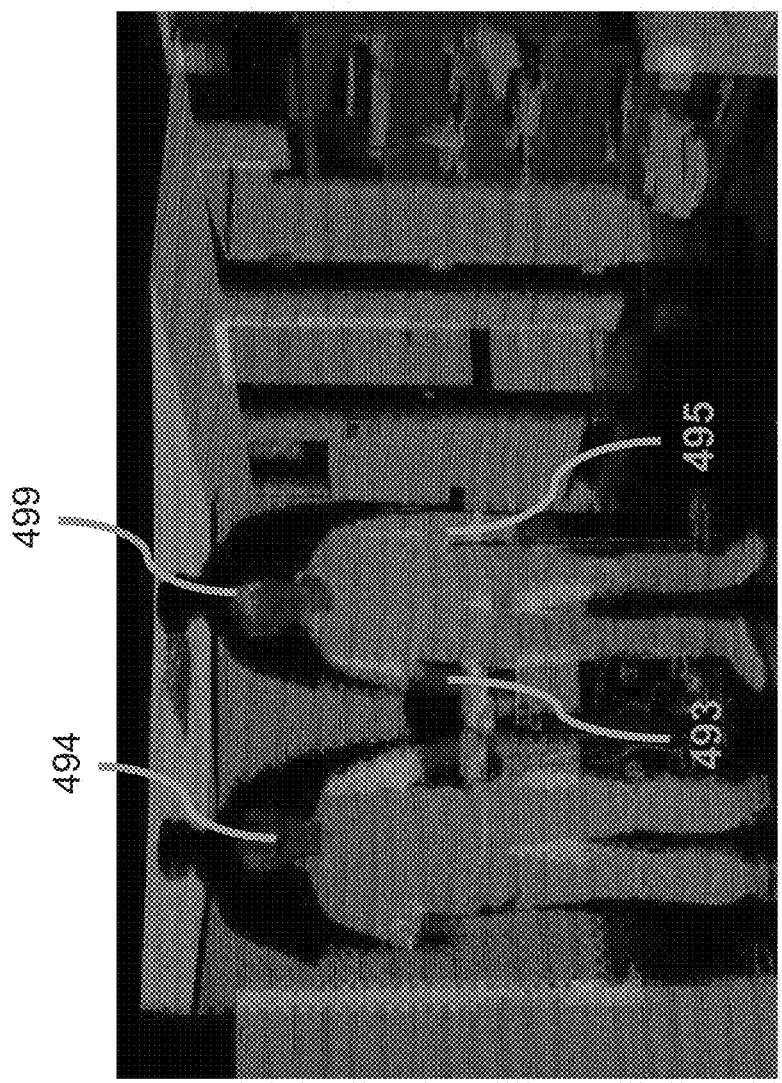

FIG. 4J shows images 491 and 492 each representing a depolarization ratio of an image of people. It is shown that skin (e.g., faces 494, 497, arm 493, 496) is more polarization maintaining while hair 499 and clothes 495, 498 are more depolarizing. Similar depolarization ratios are obtained from an image of animals.

Based on the observations from FIG. 4A to FIG. 4J, a type of object may be determined or detected based on depolarization ratios. In some implementations, object detection based on a depolarization ratio can disambiguate several key surfaces of an object. For example, (1) asphalt is more polarization maintaining while grass, rough concrete, or gravel are more depolarizing; (2) metal poles are more polarization maintaining while trees, telephone poles, or utility poles are more depolarizing; (3) metal surfaces (or a back surface of signage) are more polarization maintaining while retro-signs (or a front surface of signage) are more depolarizing; (4) road surfaces are more polarization maintaining while lane markings are more depolarizing; (5) vehicle license plates are more depolarizing while other surfaces of vehicle are more polarization maintaining; and (6) skin (of people or animals) is more polarization maintaining while hair and clothes are more depolarizing.

This disambiguation techniques can help recognize certain road markings, signs, pedestrians, etc. In some implementations, the depolarization ratio can detect or recognize sparse features of an object (e.g., features having a relatively smaller region), so that such sparse features can be easily registered for disambiguation of different objects. For example, sparse features of a person (e.g., features of skin detected based on low depolarization ratio) can be utilized to detect or recognize a pedestrian.

In some implementations, disambiguation of different objects or materials based on the depolarization ratio can help a perception system (e.g., the perception subsystem 154 of the vehicle control system 120 in FIG. 1A) or a planning system (e.g., the planning subsystem 156 of the vehicle control system 120 in FIG. 1A) to more accurately detect, track, determine, and/or classify objects within the environment surrounding the vehicle (e.g., using artificial intelligence techniques). The perception subsystem 154 may calculate depolarization ratios of an image of an object obtained from a lidar system (e.g., the lidar systems shown in FIGS. 3A and 3B), or receive depolarization ratios calculated by the lidar system. The perception subsystem 154 may classify the object based on (1) the obtained depolarization ratios and (2) relationship between key feature surfaces (e.g., asphalt, grass, rough concrete, gravel, metal poles, trees, telephone poles, utility poles, sign surfaces, lane markings, vehicle surfaces, license plate, skin, hair, etc.) and their depolarization ratios as described above. Machine learning models or techniques can be utilized in classifying objects. Such machine learning models or techniques may include, but not limited to, supervised learning, unsupervised learning, semi-supervised learning, regression algorithms, instance-based algorithms, regularization algorithms, decision tree algorithms, Bayesian algorithms, clustering algorithms, artificial neural networks, deep learning algorithms. dimension reduction algorithms (e.g., PCA), ensemble algorithms, support vector machines (SVM), and so on.

Referring to FIG. 1A, the perception subsystem 154 may perform, based on results of the object classification, functions such as detecting, tracking, determining, and/or identifying objects within the environment surrounding vehicle 110A. The planning subsystem 156 can perform, based on results of the object classification, functions such as planning a trajectory for vehicle 110A over some timeframe given a desired destination as well as the static and moving objects within the environment. The control subsystem 158 can perform, based on results of the object classification, functions such as generating suitable control signals for controlling the various controls in the vehicle control system 120 in order to implement the planned trajectory of the vehicle 110A.

In some implementations, an autonomous vehicle control system (e.g., the vehicle control system 120 in FIG. 1A) may include one or more processors (e.g., the processor 122 in FIG. 1A, a processor of the processing system 318 in FIG. 3A, a processor of the processing system 358 in FIG. 3B). The one or more processors may be configured to cause a transmitter (e.g., the scanner 308 in FIG. 3A) to transmit a transmit signal from a laser source (e.g., the laser 302 in FIG. 3A). The one or more processors may be configured to cause a receiver (e.g., the scanner 308 in FIG. 3A) to receive a return signal (e.g., the return 311 in FIG. 3A) reflected by an object (e.g., the object 310 in FIG. 3A). The transmitter and the receiver may be a single transceiver (e.g., the scanner 308 in FIG. 3A). The one or more processors may be configured to cause one or more optics (e.g., the circulator optics 306 and PBS 312 in FIG. 3A) to generate a first polarized signal of the return signal with a first polarization (e.g., the first polarized optical signal 317 in FIG. 3A), and generate a second polarized signal of the return signal with a second polarization that is orthogonal to the first polarization (e.g., the second polarized optical signal 319 in FIG. 3A).

In some implementations, the one or more processors may be configured to cause a polarization beam splitter (PBS) of the one or more optics (e.g., the PBS 312 in FIG. 3A) to polarize the return signal with the first polarization to generate the first polarized signal. The one or more processors may be configured to cause the PBS to polarize the return signal with the second polarization to generate the second polarized signal. The one or more processors may be configured to cause a first detector of the one or more optics (e.g., the first detector 314 in FIG. 3A) to detect the first polarized signal. The one or more processors may be configured to cause a second detector of the one or more optics (e.g., the second detector 316 in FIG. 3A) to detect the second polarized signal.

In some implementations, the first and second detectors may be a single detector (e.g., the single detector 354 in FIG. 3B). The one or more processors may be configured to cause a phase shifter (e.g., the shifter 356 in FIG. 3B) to shift a phase of the second polarized signal. The one or more processors may be configured to cause the single detector to detect the first polarized signal, and to detect the phase-shifted second polarized signal (e.g., the first phase-shifted second polarized signal 357 in FIG. 3B).

The one or more processors may be configured to operate a vehicle based on a ratio of reflectivity (e.g., a depolarization ratio) between the first polarized signal and the second polarized signal. In some implementations, the first polarized signal may indicate a first image of the object with the first polarization, and the second polarized signal may indicate a second image of the object with the second polarization. The one or more processors may be configured to calculate the ratio of reflectivity by calculating a ratio between an average signal-to-noise ratio (SNR) value of the first image and an average SNR value of the second image (e.g., using Equation 1).

The one or more processors may be configured to determine a type of the object based on the calculated ratio of reflectivity. For example, the perception subsystem 154 (see FIG. 1A) may classify the object based on (1) the obtained depolarization ratios and (2) relationship between key feature surfaces (e.g., asphalt, grass, rough concrete, gravel, metal poles, trees, telephone poles, utility poles, sign surfaces, lane markings, vehicle surfaces, license plate, skin, hair, etc.) and their depolarization ratios. The one or more processors may be configured to control a trajectory of the vehicle based on the type of the object. For example, the planning subsystem 156 (see FIG. 1A) may perform, based on results of the object classification, functions such as planning a trajectory for vehicle 110A (see FIG. 1A). The control subsystem 158 (see FIG. 1A) may perform, based on results of the object classification, functions such as generating suitable control signals for controlling the various controls in the vehicle control system 120 (see FIG. 1A) in order to implement the planned trajectory of the vehicle 110A.

In some implementations, the one or more processors may be configured to determine the type of the object as one of asphalt road, lane markings, rough concrete road, grass, or gravel. The one or more processors may be configured to determine, based on the calculated ratio of reflectivity, that the object is an asphalt road. For example, the perception subsystem 154 may classify an object as either asphalt road, lane markings, rough concrete road, grass, or gravel (e.g., by applying machine learning techniques to images obtained from a lidar system without using depolarization ratios), and determine whether a depolarization ratio of the object is smaller than a predetermined threshold. In response to determining that the depolarization ratio of the object is smaller than the predetermined threshold, the perception subsystem 154 may determine that the object is an asphalt road.

In some implementations, the one or more processors may be configured to determine the type of the object as one of metal poles, trees, or utility poles. The one or more processors may be configured to determine, based on the calculated ratio of reflectivity, that the object is a metal pole. For example, the perception subsystem 154 may classify an object as either metal poles, trees, or utility poles (e.g., by applying machine learning techniques to images obtained from a lidar system without using depolarization ratios), and determine whether a depolarization ratio of the object is smaller than a predetermined threshold. In response to determining that the depolarization ratio of the object is smaller than the predetermined threshold, the perception subsystem 154 may determine that the object is a metal pole (or metal poles).

In some implementations, the one or more processors may be configured to determine the type of the object as one or more persons. The one or more processors may be configured to determine, based on the calculated ratio of reflectivity, respective regions of skin and clothes of the one or more persons. For example, the perception subsystem 154 may classify an object as one or more persons (e.g., by applying machine learning techniques to images obtained from a lidar system without using depolarization ratios), determine whether a depolarization ratio of a first portion of the object is smaller than a first predetermined threshold, and determine whether a depolarization ratio of a second portion of the object is greater than a second predetermined threshold. In response to determining that the depolarization ratio of the first portion of the object is smaller than the first predetermined threshold, the perception subsystem 154 may determine that the first portion of the object is skin. In response to determining that the depolarization ratio of the second portion of the object is greater than the second predetermined threshold, the perception subsystem 154 may determine that the second portion of the object is hair or clothes.

Figure 5:
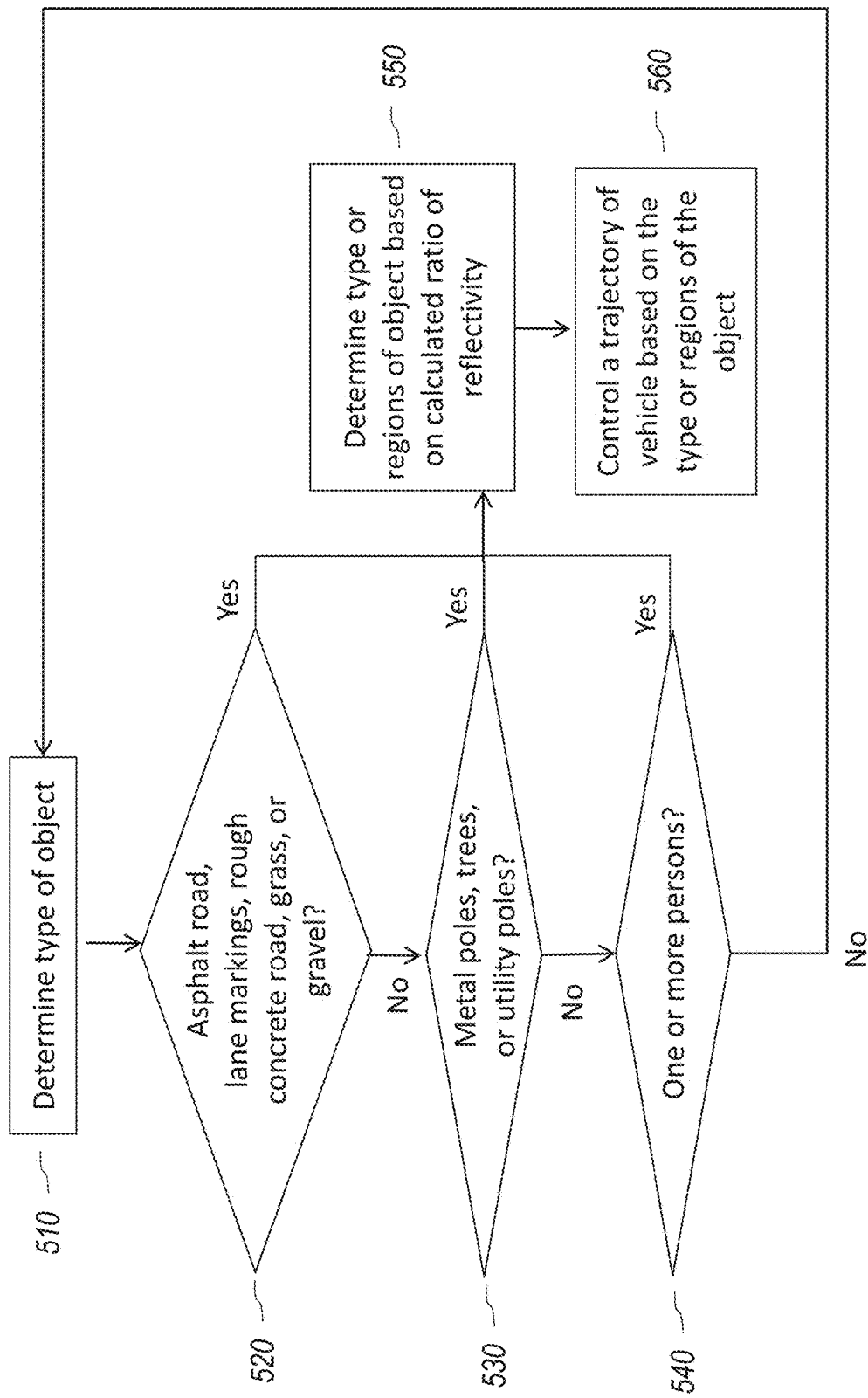
FIG. 5 is a flowchart illustrating an example methodology for controlling a trajectory of a vehicle based on a depolarization ratio according to some implementations.

FIG. 5 is a flowchart illustrating an example methodology for controlling a trajectory of a vehicle based on a depolarization ratio according to some implementations. In this example methodology, the process begins at step 510 by determining a type of an object based on one or more images of the object obtained from a lidar system (e.g., the sensor 136 in FIG. 1A, the lidar systems 300, 350 in FIG. 3A and FIG. 3B) by one or more processors (e.g., the processor 122 in FIG. 1A, a processor of the processing system 318 in FIG. 3A, a processor of the processing system 358 in FIG. 3B).

At step 520, in some implementations, the one or more processors may determine whether the object is an asphalt road, lane markings, a rough concrete road, grass, or gravel. In response to determining that the object is an asphalt road, lane markings, a rough concrete road, grass, or gravel, at step 550, the one or more processors may determine, based on a calculated ratio of reflectivity, that the object is an asphalt road. For example, the perception subsystem 154 may classify an object as either asphalt road, lane markings, rough concrete road, grass, or gravel (e.g., by applying machine learning techniques to images obtained from a lidar system without using depolarization ratios), and determine whether a depolarization ratio of the object is smaller than a predetermined threshold. In response to determining that the depolarization ratio of the object is smaller than the predetermined threshold, the perception subsystem 154 may determine that the object is an asphalt road.

At step 530, the one or more processors may determine whether the object is metal poles, trees, or utility poles. In response to determining that the object is metal poles, trees, or utility poles, at step 550, the one or more processors may determine, based on a calculated ratio of reflectivity, that the object is a metal pole (or metal poles). For example, the perception subsystem 154 may classify an object as either metal poles, trees, or utility poles (e.g., by applying machine learning techniques to images obtained from a lidar system without using depolarization ratios), and determine whether a depolarization ratio of the object is smaller than a predetermined threshold. In response to determining that the depolarization ratio of the object is smaller than the predetermined threshold, the perception subsystem 154 may determine that the object is a metal pole (or metal poles).

At step 540, the one or more processors may determine whether the object is one or more persons. In some implementations, at step 550, the one or more processors may determine, based on the calculated ratio of reflectivity, respective regions of skin and clothes of the one or more persons. For example, the perception subsystem 154 may classify an object as one or more persons (e.g., by applying machine learning techniques to images obtained from a lidar system without using depolarization ratios), determine whether a depolarization ratio of a first portion of the object is smaller than a first predetermined threshold, and determine whether a depolarization ratio of a second portion of the object is greater than a second predetermined threshold. In response to determining that the depolarization ratio of the first portion of the object is smaller than the first predetermined threshold, the perception subsystem 154 may determine that the first portion of the object is skin. In response to determining that the depolarization ratio of the second portion of the object is greater than the second predetermined threshold, the perception subsystem 154 may determine that the second portion of the object is hair or clothes.

At step 560, the one or more processors may control a trajectory of a vehicle based on the type of the object (e.g., type of asphalt road or metal poles as determined at step 550) or based on the region of the object (e.g., regions or skin, hair, or clothes as determined at step 550). For example, the planning subsystem 156 can perform, based on the determined type of the object (e.g., type of asphalt road or metal poles), functions such as planning a trajectory for vehicle 110A over the static object within the environment. The planning subsystem 156 also can determine, based on the determined regions of the object (e.g., regions or skin, hair, or clothes of one or more people), a trajectory of the moving object (e.g., one or more people), and plan, based on the trajectory of the moving object, a trajectory for vehicle 110A over the moving object within the environment.

Figure 6:
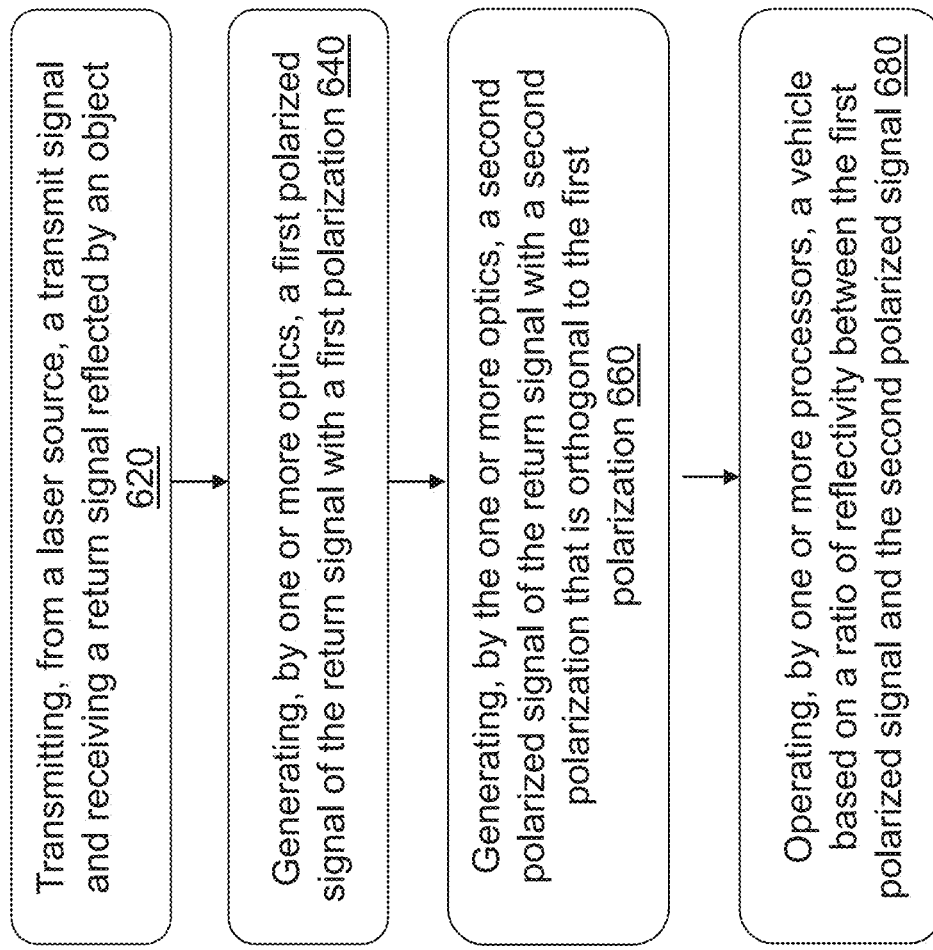
FIG. 6 is a flowchart illustrating an example methodology for operating a vehicle based on a depolarization ratio according to some implementations.

FIG. 6 is a flowchart illustrating an example methodology for operating a vehicle based on a depolarization ratio according to some implementations. In this example methodology, the process begins at step 620 by transmitting, from a laser source (e.g., the laser 302 in FIG. 3A), a transmit signal (e.g., the transmit signal 309 in FIG. 3A) and receiving a return signal (e.g., the return signal 311 in FIG. 3A) reflected by an object (e.g., the object 310 in FIG. 3A). In some implementations, the transmitting the transmit signal and the receiving the return signal are performed by a single transceiver (e.g., the scanner 308 in FIG. 3A).

At step 640, in some implementations, a first polarized signal of the return signal with a first polarization (e.g., the first polarized optical signal 317 in FIG. 3A) may be generated by one or more optics (e.g., the circulator optics 306 and PBS 312 in FIG. 3A). In generating the first polarized signal, the return signal may be polarized with the first polarization by a polarization beam splitter (PBS) of the one or more optics (e.g., the PBS 312 in FIG. 3A) to generate the first polarized signal. The first polarized signal may be detected by a first detector of the one or more optics (e.g., the first detector 314 in FIG. 3A).

At step 660, in some implementations, a second polarized signal of the return signal with a second polarization that is orthogonal to the first polarization (e.g., the second polarized optical signal 319 in FIG. 3A), may be generated by the one or more optics. In generating the second polarized signal, the return signal may be polarized with the second polarization by the PBS to generate the second polarized signal. The second polarized signal may be detected by a second detector of the one or more optics (e.g., the second detector 316 in FIG. 3A).

In some implementations, the first and second detectors may be a single detector (e.g., the single detector 354 in FIG. 3B). In generating the first polarized signal, the first polarized signal may be detected by the single detector. In generating the second polarized signal, a phase of the second polarized signal may be shifted by a phase shifter (e.g., the shifter 356 in FIG. 3B). The phase-shifted second polarized signal (e.g., the first phase-shifted second polarized signal 357 in FIG. 3B) may be detected by the single detector (e.g., the single detector 354 in FIG. 3B).

At step 680, a vehicle (e.g., the vehicle 110A in FIG. 1A) may be operated by one or more processors (e.g., the processor 122 in FIG. 1A, a processor of the processing system 318 in FIG. 3A, a processor of the processing system 358 in FIG. 3B) based on a ratio of reflectivity (e.g., a depolarization ratio) between the first polarized signal and the second polarized signal. In some implementations, the first polarized signal may indicate a first image of the object with the first polarization, and the second polarized signal may indicate a second image of the object with the second polarization. In calculating the ratio of reflectivity, a ratio between an average signal-to-noise ratio (SNR) value of the first image and an average SNR value of the second image may be calculated (e.g., using Equation 1).

In operating the vehicle based on the ratio of reflectivity, a type of the object may be determined based on the calculated ratio of reflectivity. For example, the perception subsystem 154 (see FIG. 1A) may classify the object based on (1) the obtained depolarization ratios and (2) relationship between key feature surfaces (e.g., asphalt, grass, rough concrete, gravel, metal poles, trees, telephone poles, utility poles, sign surfaces, lane markings, vehicle surfaces, license plate, skin, hair, etc.) and their depolarization ratios. In some implementations, a trajectory of the vehicle may be controlled based on the type of the object. For example, the planning subsystem 156 (see FIG. 1A) may perform, based on results of the object classification, functions such as planning a trajectory for vehicle 110A (see FIG. 1A).

In some implementations, in determining the type of the object, the type of the object may be determined as one of asphalt road, lane markings, rough concrete road, grass, or gravel. It may be determined, based on the calculated ratio of reflectivity, that the object is an asphalt road. For example, the perception subsystem 154 may classify an object as either asphalt road, lane markings, rough concrete road, grass, or gravel (e.g., by applying machine learning techniques to images obtained from a lidar system without using depolarization ratios), and determine whether a depolarization ratio of the object is smaller than a predetermined threshold. In response to determining that the depolarization ratio of the object is smaller than the predetermined threshold, the perception subsystem 154 may determine that the object is an asphalt road.

In some implementations, in determining the type of the object, the type of the object may be determined as one of metal poles, trees, or utility poles. It may be determined, based on the calculated ratio of reflectivity, that the object is a metal pole. For example, the perception subsystem 154 may classify an object as either metal poles, trees, or utility poles (e.g., by applying machine learning techniques to images obtained from a lidar system without using depolarization ratios), and determine whether a depolarization ratio of the object is smaller than a predetermined threshold. In response to determining that the depolarization ratio of the object is smaller than the predetermined threshold, the perception subsystem 154 may determine that the object is a metal pole (or metal poles).

In some implementations, in determining the type of the object, the type of the object may be determined as one or more persons. It may be determined, based on the calculated ratio of reflectivity, respective regions of skin and clothes of the one or more persons. For example, the perception subsystem 154 may classify an object as one or more persons (e.g., by applying machine learning techniques to images obtained from a lidar system without using depolarization ratios), determine whether a depolarization ratio of a first portion of the object is smaller than a first predetermined threshold, and determine whether a depolarization ratio of a second portion of the object is greater than a second predetermined threshold. In response to determining that the depolarization ratio of the first portion of the object is smaller than the first predetermined threshold, the perception subsystem 154 may determine that the first portion of the object is skin. In response to determining that the depolarization ratio of the second portion of the object is greater than the second predetermined threshold, the perception subsystem 154 may determine that the second portion of the object is hair or clothes.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of blocks in the processes disclosed is an example of illustrative approaches. Based upon design preferences, it is understood that the specific order or hierarchy of blocks in the processes may be rearranged while remaining within the scope of the previous description. The accompanying method claims present elements of the various blocks in a sample order, and are not meant to be limited to the specific order or hierarchy presented.

The previous description of the disclosed implementations is provided to enable any person skilled in the art to make or use the disclosed subject matter. Various modifications to these implementations will be readily apparent to those skilled in the art, and the generic principles defined herein may be applied to other implementations without departing from the spirit or scope of the previous description. Thus, the previous description is not intended to be limited to the implementations shown herein but is to be accorded the widest scope consistent with the principles and novel features disclosed herein.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the blocks of various examples must be performed in the order presented. As will be appreciated by one of skill in the art the order of blocks in the foregoing examples may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the examples disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general purpose processor, a DSP, an ASIC, an FPGA or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In some exemplary examples, the functions described may be implemented in hardware, software, firmware, or any combination thereof. If implemented in software, the functions may be stored as one or more instructions or code on a non-transitory computer-readable storage medium or non-transitory processor-readable storage medium. The blocks of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable any person skilled in the art to make or use the present disclosure. Various modifications to these examples will be readily apparent to those skilled in the art, and the generic principles defined herein may be applied to some examples without departing from the spirit or scope of the disclosure. Thus, the present disclosure is not intended to be limited to the examples shown herein but is to be accorded the widest scope consistent with the following claims and the principles and novel features disclosed herein.

What is claimed is:

1. A light detection and ranging (LIDAR) system for a vehicle, the lidar system comprising:
a laser source configured to output a beam;
a transmitter configured to transmit a transmit signal that is generated based on the beam;
a receiver configured to receive a return signal reflected by an object in response to the transmit signal;
one or more optics configured to generate a first signal and a second signal based on the return signal, wherein the first signal and the second signal have different polarizations; and
a processor configured to determine a type of the object by processing a signal-to-noise ratio (SNR) value of the first signal and a SNR value of the second signal,
wherein the type of the object includes at least one of a type of a road, a type of an object proximate to the road, or a characteristic of a part of a person proximate to the road.

2. The lidar system as recited in claim 1, wherein the one or more optics comprise:
a polarization beam splitter (PBS) configured to
polarize the return signal with a first polarization to generate the first signal, and
polarize the return signal with a second polarization to generate the second signal.

3. The lidar system recited in claim 2, further comprising:
a first detector configured to detect the first signal; and
a second detector configured to detect the second signal.

4. The lidar system as recited in claim 2, further comprising:
a phase shifter configured to shift a phase of the second signal; and
a detector that is configured to detect the first signal and the phase shifted second signal.

5. An autonomous vehicle control system comprising one or more processors, wherein the one or more processors are configured to:
cause a laser source to output a beam;
cause a transmitter to transmit a transmit signal that is generated based on the beam;
cause a receiver to receive a return signal reflected by an object in response to the transmit signal;
cause one or more optics to generate a first signal and a second signal based on the return signal wherein the first signal and the second signal have different polarizations;
determine a type of the object by processing a signal-to-noise ratio (SNR) value of the first signal and a SNR value of the second signal; and
operate a vehicle based on the type of the object,
wherein the type of the object includes at least one of a type of a road, a type of an object proximate to the road, or a characteristic of a part of a person proximate to the road.

6. The autonomous vehicle control system as recited in claim 5, wherein the one or more processors are further configured to:
cause a polarization beam splitter (PBS) of the one or more optics to polarize the return signal with a first polarization to generate the first signal; and
cause the PBS to polarize the return signal with a second polarization to generate the second signal.

7. The autonomous vehicle control system as recited in claim 6, wherein the one or more processors are further configured to:
cause a first detector of the one or more optics to detect the first signal; and
cause a second detector of the one or more optics to detect the second signal.

8. The autonomous vehicle control system as recited in claim 6, wherein the one or more processors are further configured to:
cause a phase shifter to shift a phase of the second signal; and
cause a detector to detect the first signal and the phase-shifted second signal.

9. The autonomous vehicle control system as recited in claim 5, wherein the first signal indicates a first image of the object with a first polarization, and the second signal indicates a second image of the object with a second polarization, and
the one or more processors are further configured to:
calculate a ratio of reflectivity by calculating a ratio between an average signal-to-noise ratio (SNR) value of the first image and an average SNR value of the second image;
determine the type of the object based on the calculated ratio of reflectivity; and
control a trajectory of the vehicle based on the type of the object.

10. The autonomous vehicle control system as recited in claim 9, wherein
the type of the object includes a type of a road, and
the one or more processors are further configured to:
determine the type of the road as one of asphalt road, lane markings, rough concrete road, grass, or gravel; and
determine, based on the calculated ratio of reflectivity, that the object is an asphalt road.

11. The autonomous vehicle control system as recited in claim 9, wherein
the type of the object includes a type of an object proximate to a road, and
the one or more processors are further configured to:
determine the type of the object proximate to the road as one of metal poles, trees, or utility poles; and
determine, based on the calculated ratio of reflectivity, that the object is a metal pole.

12. The autonomous vehicle control system as recited in claim 9, wherein
the type of the object includes a characteristic of a part of a person proximate to a road, and
the one or more processors are further configured to:
determine the type of the object as the characteristic of the part of the person proximate to the road; and
determine, based on the calculated ratio of reflectivity, respective parts of skin and clothes of the person proximate to the road.

13. A autonomous vehicle, comprising:
a light detection and ranging (LIDAR) system comprising:
a laser source configured to output a beam,
a transmitter configured to transmit a transmit signal that is generated based on the beam,
a receiver configured to receive a return signal reflected by an object in response to the transmit signal, and one or more optics configured to generate a first signal and a second signal based on the return signal wherein the first signal and the second signal have different polarizations;

at least one of a steering system or a braking system; and a vehicle controller comprising one or more processors configured to:

determine a type of the object by processing a signal-to-noise ratio (SNR) value of the first signal and a SNR value of the second signal; and control operation of the at least one of the steering system or the braking system based on the type of the object, wherein the type of the object includes at least one of a type of a road, a type of an object proximate to the road, or a characteristic of a part of a person proximate to the road.

14. The autonomous vehicle as recited in claim 13, wherein the one or more processors are further configured to:

cause a polarization beam splitter (PBS) of the one or more optics to polarize the return signal with a first polarization to generate the first signal; and cause the PBS to polarize the return signal with a second polarization to generate the second signal.

15. The autonomous vehicle as recited in claim 14, wherein the one or more processors are further configured to:

cause a first detector of the one or more optics to detect the first signal; and cause a second detector of the one or more optics to detect the second signal.

16. The autonomous vehicle as recited in claim 14, wherein the one or more processors are further configured to:

cause a phase shifter to shift a phase of the second signal; and cause a detector to detect the first signal and the phase-shifted second signal.

17. The autonomous vehicle as recited in claim 13, wherein the first signal indicates a first image of the object with a first polarization, and the second signal indicates a second image of the object with a second polarization, and the one or more processors are further configured to:

calculate a ratio of reflectivity by calculating a ratio between an average signal-to-noise ratio (SNR) value of the first image and an average SNR value of the second image;

determine the type of the object based on the calculated ratio of reflectivity; and control a trajectory of the autonomous vehicle based on the type of the object.

18. The autonomous vehicle as recited in claim 17, wherein the type of the object includes a type of a road, and the one or more processors are further configured to:

determine the type of the road as one of asphalt road, lane markings, rough concrete road, grass, or gravel; and determine, based on the calculated ratio of reflectivity, that the object is an asphalt road.

19. The autonomous vehicle as recited in claim 17, wherein the type of the object includes a type of an object proximate to a road, and the one or more processors are further configured to:

determine the type of the object proximate to a road as one of metal poles, trees, or utility poles; and determine, based on the calculated ratio of reflectivity, that the object is a metal pole.

20. The autonomous vehicle as recited in claim 17, wherein the type of the object includes a characteristic of a part of a person proximate to a road, and the one or more processors are further configured to:

determine the type of the object as the characteristic of the part of the person proximate to the road; and determine, based on the calculated ratio of reflectivity, respective parts of skin and clothes of the person proximate to the road.

* * * * *